(12) United States Patent
Yamane et al.

(10) Patent No.: US 6,845,377 B2
(45) Date of Patent: Jan. 18, 2005

(54) RETRIEVAL SYSTEM AND METHOD USING DISTANCE INDEX

(75) Inventors: Yasuo Yamane, Kawasaki (JP); Fumihiko Kozakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 10/102,829

(22) Filed: Mar. 22, 2002

(65) Prior Publication Data

US 2003/0088563 A1 May 8, 2003

(30) Foreign Application Priority Data

Nov. 6, 2001 (JP) ........................................ 2001-341003

(51) Int. Cl.[7] .............................................. G06F 17/30
(52) U.S. Cl. ......................... 707/100; 707/2; 707/101
(58) Field of Search ........................... 707/2, 3, 7, 100, 707/101

(56) References Cited

U.S. PATENT DOCUMENTS

| | | | | |
|---|---|---|---|---|
| 5,647,058 A | * | 7/1997 | Agrawal et al. | 707/1 |
| 6,154,746 A | * | 11/2000 | Berchtold et al. | 707/100 |
| 6,161,105 A | * | 12/2000 | Keighan et al. | 707/100 |
| 6,453,246 B1 | * | 9/2002 | Agrafiotis et al. | 702/27 |
| 6,760,714 B1 | * | 7/2004 | Caid et al. | 706/14 |

FOREIGN PATENT DOCUMENTS

WO 99/08200 2/1999

OTHER PUBLICATIONS

Volker Gaede, et al. "Multidimensional Access Methods", ACM Computing Surveys, Jun. 1998, vol. 30, No. 2 pp. 170–231.

W.A. Burkhard, et al., "Some Approaches to Best–Match File Searching" Communications of the ACM, vol. 16, No. 4, Apr. 1973, pp. 230–236.

T. Bozkaya, et al., "Distance–based Indexing for High–dimensional Metric Spaces", Proceedings of ACM SIGMOD 1997 pp. 357–368.

Surajit Chaudhuri, et al., Rethinking Database System Architecture: Towards a Self–tuning RISC–style Database System:, Proceedings of the 26th International Conference on Very Large Databases, 2000, pp. 1–10.

* cited by examiner

Primary Examiner—Greta Robinson
Assistant Examiner—Cheryl Lewis
(74) Attorney, Agent, or Firm—Staas & Halsey LLP

(57) ABSTRACT

Similarity retrieval is performed through the use of a distance index which contains a concatenated key and pointer information and retains a dictionary type order in the concatenated key. The concatenated key is produced by discretizing the distance from each of a plurality of reference points to an object point representing information to be retrieved in a multidimensional space consisting of a plurality of dimensions corresponding to the plurality of feature parameters and concatenating the resulting discretized distances. The use of the concatenated key allows candidate points in the d-distance neighborhood to be narrowed down.

21 Claims, 23 Drawing Sheets

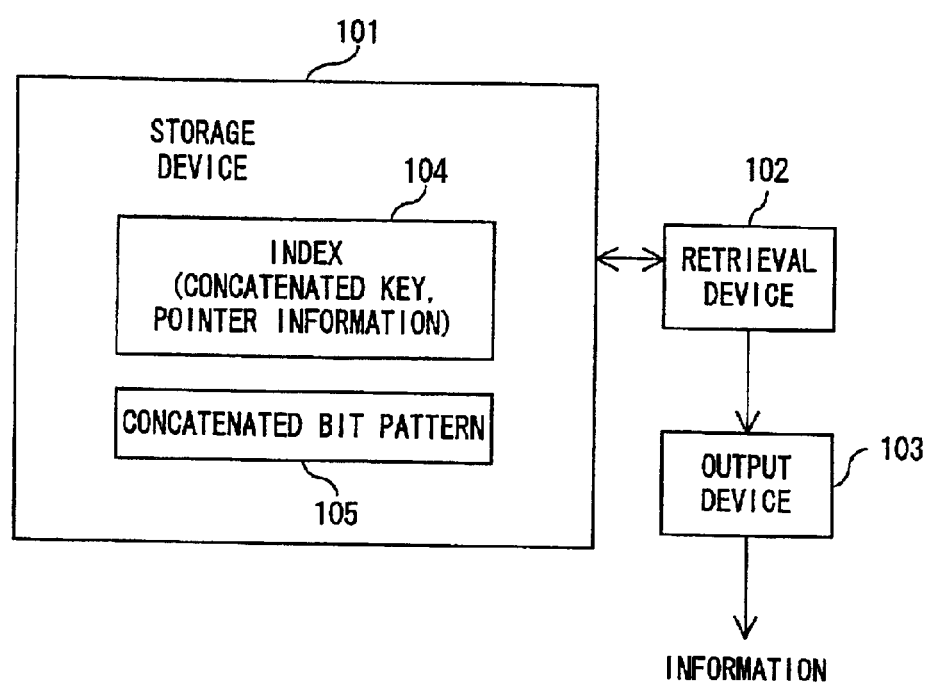
F I G. 1

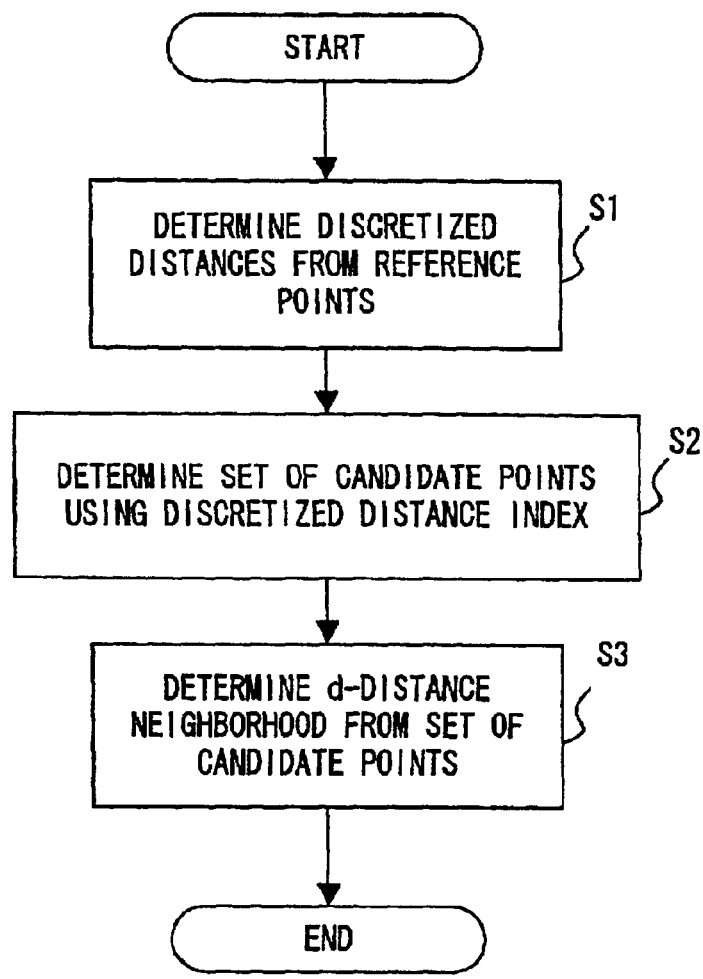
F I G. 5

| id | d1 | d2 |
|---|---|---|
| 1 | 0.1 | 0.9 |
| 2 | 0.2 | 0.3 |
| 3 | 0.3 | 0.6 |
| 4 | 0.4 | 0.2 |
| 5 | 0.5 | 0.8 |
| 6 | 0.6 | 0.5 |
| 7 | 0.7 | 0.4 |
| 8 | 0.8 | 0.7 |
| 9 | 0.9 | 0.1 |

FIG. 7

| id | d1 | d2 |
|----|----|----|
| 2  | 1  | 1  |
| 3  | 1  | 2  |
| 1  | 1  | 3  |
| 4  | 2  | 1  |
| 6  | 2  | 2  |
| 5  | 2  | 3  |
| 9  | 3  | 1  |
| 7  | 3  | 2  |
| 8  | 3  | 3  |

| id | d1 | d2 | d3 |
|---|---|---|---|
| 1 | 1 | 1 | 1 |
| 2 | 1 | 1 | 2 |
| 3 | 1 | 1 | 3 |
| 4 | 1 | 2 | 1 |
| 5 | 1 | 2 | 2 |
| 6 | 1 | 2 | 3 |
| 7 | 1 | 3 | 1 |
| 8 | 1 | 3 | 2 |
| 9 | 1 | 3 | 3 |
| 10 | 2 | 1 | 1 |
| 11 | 2 | 1 | 2 |
| 12 | 2 | 1 | 3 |
| 13 | 2 | 2 | 1 |
| 14 | 2 | 2 | 2 |

| id | d1 | d2 | d3 |
|---|---|---|---|
| 15 | 2 | 2 | 3 |
| 16 | 2 | 3 | 1 |
| 17 | 2 | 3 | 2 |
| 18 | 2 | 3 | 3 |
| 19 | 3 | 1 | 1 |
| 20 | 3 | 1 | 2 |
| 21 | 3 | 1 | 3 |
| 22 | 3 | 2 | 1 |
| 23 | 3 | 2 | 2 |
| 24 | 3 | 2 | 3 |
| 25 | 3 | 3 | 1 |
| 26 | 3 | 3 | 2 |
| 27 | 3 | 3 | 3 |

|    | d1       | d2       |
|----|----------|----------|
| t1 | 00001000 | 00010000 |
| t2 | 00010000 | 00000100 |
| t3 | 00010000 | 00000100 |

FIG. 17

|  | d1 | d2 |
|---|---|---|
| q | 00011000 | 00001100 |

FIG. 19

| $c_1$ | $c_2$ | ... | $c_{64}$ | d |
|---|---|---|---|---|
| | | | | |

FIG. 20

| c1 | c2 | ... | c64 | b |
|----|----|----|----|---|
|    |    |    |    |   |

FIG. 21

RETRIEVAL SYSTEM AND METHOD USING DISTANCE INDEX

BACKGROUND OF THE INVENTION

1. Field of the Invention

The present invention relates to information similarity retrieval and more specifically to a system and method for retrieving points or a collection of points close to a point specified in a multidimensional space using a distance index.

2. Description of the Related Art

In the field of computers, a process, called similarity retrieval, is frequently performed. The similarity search refers to a process of searching for information which is similar to or matches certain information. An example of such a process is to, when looking for a handbag, look for a picture of the handbag by indicating a picture of it. Another example is to, when a fingerprint is presented, search for a person having a fingerprint that matches or is similar to it, i.e., to search for a suspicious person.

In general, the similarity retrieval is performed by extracting two or more features (e.g., colors and shapes) from information (in the above examples, picture or fingerprint). That is, the features are represented as points in a multidimensional space. The distance between points is defined to conform to similarity, that is, so that the higher the similarity, the shorter the distance is. Similarity retrieval of a certain specified item of information is frequently replaced by a process of determining a point or a set of points close to a specified point in multidimensional space. The process of searching for places geographically close to each other just falls under this category. We shall refer to this, too, as similarity retrieval.

The multidimensional space is also referred to as a vector space. Use is also made of a space having a considerable number of dimensions. In the similarity retrieval, each dimension of a space represents a respective corresponding one of features (feature parameters) of information. A typical example is an n-dimensional Euclidean space ($R^n$ where R is a set of real numbers and $x^y$ represents the y-th power of x), which includes $\{0, 1\}^n$ and $N^n$ (N is a set of natural numbers). $\{0, 1\}$ is used to represent the presence or absence of features. N is used when the features are each represented by the number.

If the distance has been defined, each dimension need not represent the same kind of set. For example, as in the case of a space in which R, $\{0, 1\}$ and N are mixed, each dimension may represent a different kind of set. The most commonly used is a multidimensional space in which each dimension represents the same kind of set. A point within the multidimensional space is also referred to as a vector; however, in the description which follows, we shall use the term "point" for ease of understanding.

In the similarity retrieval there are two representative requirements; one is to obtain the k number of information items most similar to a certain specified item of information (in terms of distance, k points closest to a certain specified point), and one is to obtain information items having similarities above a certain value (in terms of distance, points within a certain distance).

In the case of fingerprint, the first requirement is to search for k most suspicious persons and the second requirement is to search for suspicious persons when the degree of suspicion is represented by a certain distance. In the former case, there is a possibility that persons who are not suspicious may also be retrieved. In the latter case, the results of retrieval become null when there is no suspicious person.

The similarity retrieval has been used in various media and have found extensive applications. Some examples of applications of the similarity retrieval are provided below.

(1) Image: Retrieval of images similar to a specific image. For example, as images similar to a specific image in which the sky came out, images in which the sky is expected to have come out are retrieved.

(2) Voice: Retrieval of voices similar to a specific voice. For example, based on uttered voice, a person who uttered the voice is identified.

(3) Text: Retrieval of text that contains a specific keyword.

(4) Character: Recognition of handwritten characters. That is, a determination is made as to which character a handwritten character is the most similar to.

(5) Map: Retrieval of tourist spots near a specific station.

As for the similarity retrieval problem, various approaches have been proposed heretofore. The most straightforward approach to the problem will be to, when a point is designated in a multidimensional space, determine the distances from all points in the space to the designated point, sort the points according to their distance to the designated point, and determine k points closest to the designated point or points within a specific distance. That is, this approach is a dynamic method.

However, this dynamic method suffers from limitations when objects to be retrieved increase in number. For example, when objects to be retrieved contain a million items of information, storing their feature parameters into main storage, calculating their distance and sorting them according to their distance involve an overwhelming number of times data are input and output. For this reason, many static methods have been considered which involve creating an index that allows for high-speed similarity retrieval before the similarity retrieval is performed. The two typical examples are described below.

Each of those methods involves creating a hierarchically structured index and dividing a multidimensional space into hierarchically related regions to restrict the range of retrieval, thereby increasing the speed of retrieval.

(1) R-tree

This method is a natural extension of a B-tree, which is the well-known means for indexing one-dimensionally ordered data. A set of vectors (points) is represented by a minimum rectangular parallelepiped that encompasses it and a hierarchical structure like B-tree is created based on that rectangular parallelepiped, which is referred to as MBR (Minimum Bounding Rectangle).

The R-tree is a height-balanced tree (each leaf has the same height) and, like the B-tree, has an excellent property of allowing access to each element in the same input/output count. It has also an excellent dynamic characteristic and, even with update processing added, will not require a large amount of time for that processing. In addition, since the tree is balanced, the update processing will not seriously degrade the performance.

(2) Quadtree

This method involves dividing a space regularly according to a predetermined ratio. Thereby, the space is divided into nonoverlapping independent subregions. If among the subregions are ones that contain vectors, the division is performed recursively, so that the space is indexed. The method is also used for image coding.

Further, various improved versions of the R-tree and quadtree have been proposed (Volker Gaede et al., "Multidimensional Access Methods", ACM Computing Surveys, Vol. 30, No. 2, pp. 170–231, June 1998).

Also, some indexes using the distances from a certain reference point have been proposed. Two examples of such indexes are listed below.

(1) Distance Index

This method involves selecting a point from a set of object points to be retrieved and indexing according to the distance from that point (W. A. Burkhard et. Al., "Some Approaches to Best-Match File Searching", Communications of the ACM, Vol. 16, No. 4, pp. 230–236, 1973). The distance is handled as an integer.

(2) Hierarchical Distance Index

This method provides a hierarchically structured distance index (T. Bozkaya et. al., "Distance-based Indexing for High-dimensional Metric Spaces", Proceedings of ACM SIGMOD, pp. 357–368, 1997). In general, a plurality of reference points are prepared.

However, the conventional similarity search has the following problems:

(1) System Simplicity

An extension to the specifications of SQL (Structured Query Language) has made database systems, particularly relational databases, more complex (Surajit chaudhuri et. al., "Rethinking Database System Architecture: Towards a Self-tuning RISC-style Database System", Proceedings of the 26-th International Conference on Very Large Databases, 2000). The functions of database systems have been increased and the optimization thereof has been made complex, so that maintenance, management and performance prediction are becoming difficult. In addition, the management cost and maintenance cost have increased. For this reason, the demand has increased for simplifying the database systems.

Conventionally, the B-tree has been used as the database indexing method. The addition of a multidimensional index to the B-tree will further increase complexity. Even with the B-tree alone, the optimization for join and select processing has increased in complexity. The addition of multidimensional indexes more complex than the B-tree will make the complexity more severe.

It is therefore desirable to create a multidimensional index through a technique, such as a B-tree, which has already been put to practical use.

(2) High-speed Performance

In many cases the similarity retrieval involves searching through very many objects, requiring high-speed performance. Even if the aforementioned simplicity has been achieved, a time-consuming system will not be put to practical use. Accordingly, it is required to achieve both simplicity and high-speed performance.

(3) Space Efficiency

In the case of a multidimensional index, the amount of disk space required increases with increasing number of dimensions. The requirement of large disk space has an effect on the data input/output count. Since the data input/output operation is a heavy process, the overall performance is affected. For this reason, it is desired that the required capacity be as little as possible.

(4) Adaptability to High Dimensions

It is not seldom that the similarity retrieval involves tens or hundreds of dimensions. In a sense it is natural and unavoidable that as the number of dimensions increases, more time and more space are required. It is therefore desired to minimize these problems and to allow practical application to high dimensions.

SUMMARY OF THE INVENTION

It is an object of the invention is to provide a retrieval device and method which allow similarity retrieval in a multidimensional space associated with feature parameters in an efficient manner with a relatively simple configuration.

A retrieval device of the invention comprises a storage device, a retrieval device, and an output device and retrieves information consisting of a plurality of feature parameters information having a feature parameter similar to a specified feature parameter.

In a first aspect of the invention, the storage device stores an index which contains a concatenated key and pointer information and retains a dictionary type order in the concatenated key. The concatenated key is produced by discretizing the distance from each of a plurality of reference points to an object point representing information to be retrieved in a multidimensional space consisting of a plurality of dimensions corresponding to the plurality of feature parameters and concatenating the resulting discrete distances. The pointer information is used to make access to information corresponding to the object point.

The retrieval device determines a set of object points within a predetermined distance from a point specified in the multidimensional space through the use of the index and acquires information corresponding to the object points in the set. The output device outputs the acquired information.

In a second aspect of the invention, the storage device stores a concatenated bit pattern and information to be retrieved. The concatenated bit pattern is produced by discretizing distances from a plurality of reference points to an object point representing information to be retrieved in a multidimensional space consisting of a plurality of dimensions corresponding to the plurality of feature parameters and concatenating a plurality of bit patterns representing the resulting discrete distances.

The retrieval device determines a set of object points within a predetermined distance from a point specified in the multidimensional space through the use of the concatenated bit pattern and acquires information corresponding to the object points in the set. The output device outputs the acquired information.

BRIEF DESCRIPTION OF THE DRAWINGS

FIG. 1 shows the principles of a retrieval device of the present invention;

FIG. 5 is a first flowchart for the calculation of distance neighborhood;

FIG. 7 shows a first index;

FIG. 8 shows a second index;

FIG. 9 shows a third index;

FIG. 17 shows a bit pattern of object points;

FIG. 19 shows a bit pattern for a sphere;

FIG. 20 shows a first record storage method;

FIG. 21 shows a second record storage method;

DESCRIPTION OF THE PREFERRED EMBODIMENTS

Figure 2:
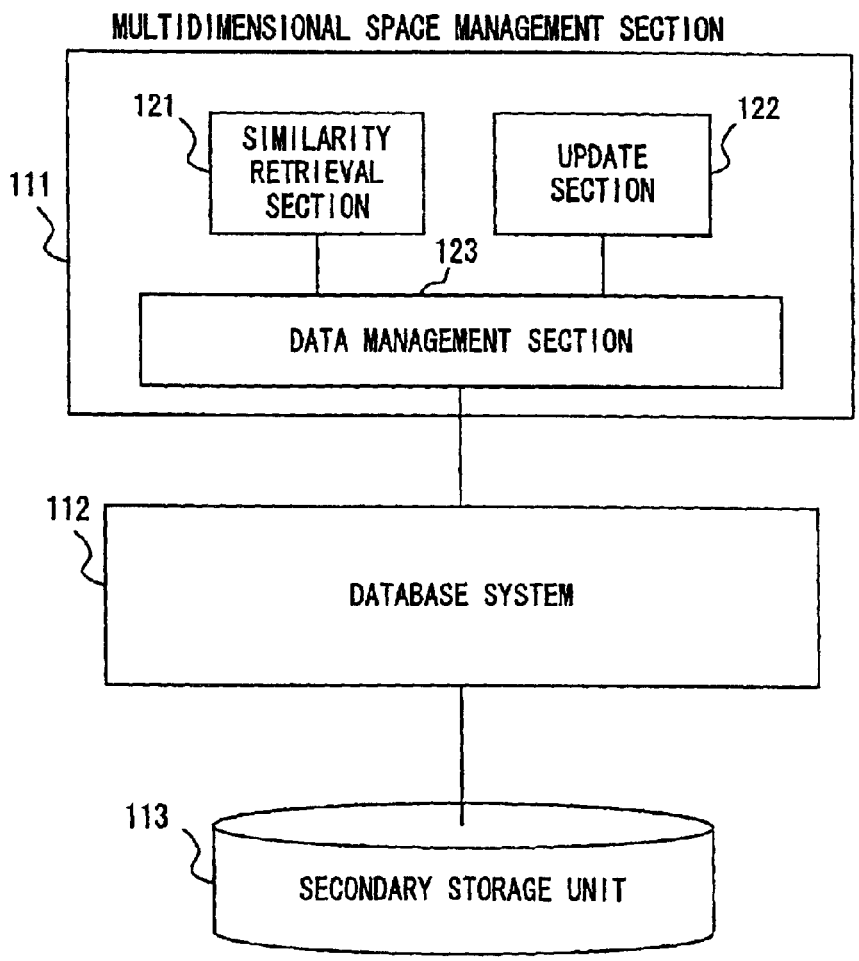
FIG. 2 shows the configuration of a retrieval system.

FIG. 1 is a diagram illustrating the principles of an information retrieval system of the present invention. The system of FIG. 1 comprises a storage device 10, a retrieval device 102, and an output device 103 and searches through items of information each having a plurality of feature parameters for information having a feature parameter similar to a specified feature parameter.

In a first aspect of the invention, the storage device 101 stores an index 104 that contains a concatenated keys and pointer information and retains the dictionary type order of the concatenated key. The concatenated key is created by discretizing the distance from each of reference points to an object point representing information to be retrieved in a multidimensional space consisting of a plurality of dimensions corresponding to a plurality of feature parameters and concatenating the resulting discretized distances. The pointer information is used to allow access to information corresponding to the object point.

The retrieval device 102 determines a set of object points within a predetermined distance from a specified point in the multidimensional space using the index 104 and obtains information corresponding to the object points included in that set. The output device 103 outputs the obtained information.

When, in a multidimensional space, a plurality of reference points are set up, a point is specified, and a predetermined distance is given, the retrieval device 102 refers to the values in the concatenated key included in the index 104 to narrow down candidates of object points within the given distance from the specified point. Then, it checks whether the candidates meet the condition and obtains a set of object points within the predetermined distance from the specified point. Finally, it obtains necessary information using the pointer information of each object point contained in that set. The information is output through the output device 103 as the results of information retrieval.

The use of discretized distances allows the conditions of similarity retrieval to be simplified so that necessary information can be obtained with fewer accesses. Creating a single-string concatenated key by concatenating a plurality of discretized distances allows an existing index, such as a B-tree, that retain the dictionary type order to be utilized readily and the data structure for retrieval to be simplified. Moreover, it requires less storage for the index, allowing for fast and efficient information retrieval processing.

In a second aspect of the invention, the storage device 101 stores a concatenated bit pattern 105 and information to be retrieved. The concatenated bit pattern is created by discretizing the distance from each of reference points to an object point representing information to be retrieved in a multidimensional space consisting of a plurality of dimensions corresponding to a plurality of feature parameters and concatenating a plurality of resulting discretized distances.

The retrieval device 102 determines a set of object points within a predetermined distance from a specified point in the multidimensional space using the concatenated bit pattern 105 and obtains information corresponding to the object points included in that set. The output device 103 outputs the obtained information.

When, in a multidimensional space, a plurality of reference points are set up, a point is specified, and a predetermined distance is given, the retrieval device 102 refers to the values in the concatenated bit pattern 105 to narrow down candidates of object points within the given distance from the specified point. Then, it checks whether the candidates meet the condition to obtain a set of object points within the predetermined distance from the specified point. Finally, it obtains information of each object point contained in that set. The information is output through the output device 103 as the results of information retrieval.

When the bit pattern is used, an index, such as a B-tree, is not necessarily required. In comparison with the retrieval system of the first aspect, the retrieval system of the second aspect requires less storage when no index is used, thus allowing for more efficient retrieval processing.

Figure 22:
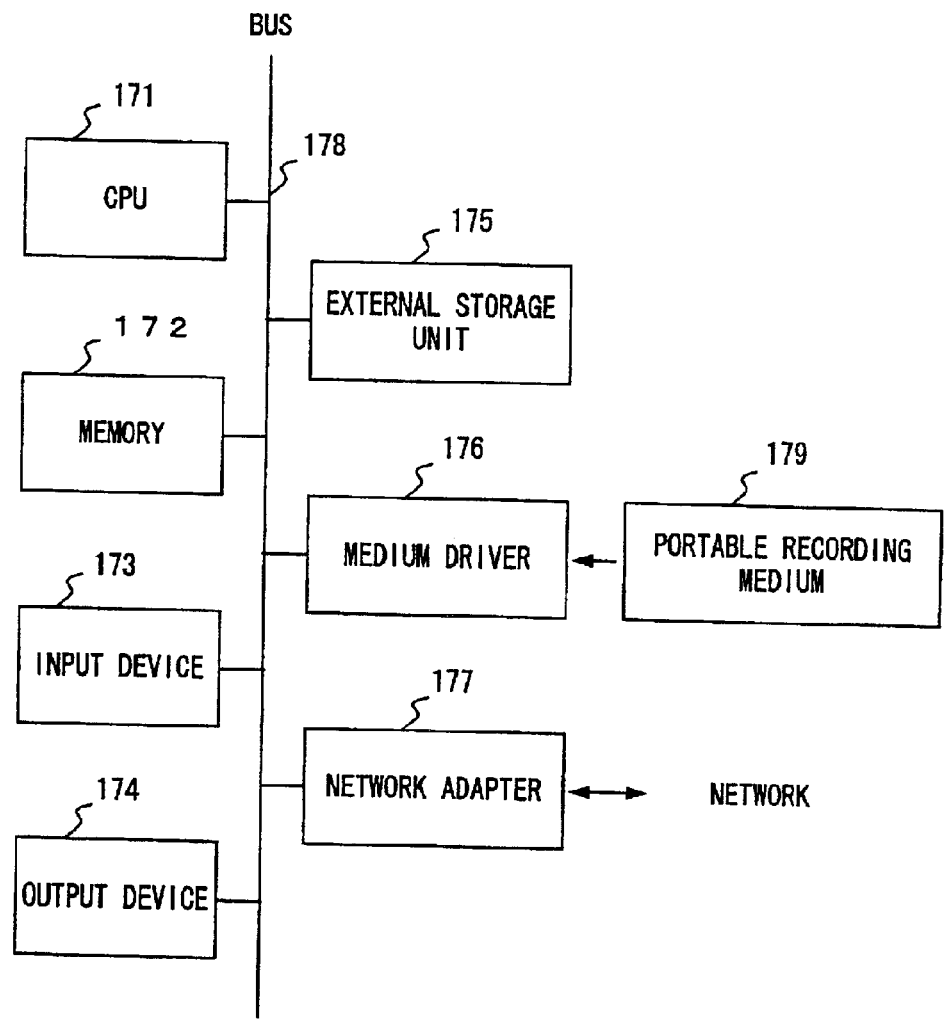
FIG. 22 shows the configuration of an information processing unit.

The storage device in FIG. 1 corresponds to, for example, a secondary storage device 113 in FIG. 2 or a memory 172 in FIG. 22 and the retrieval device 102 and the output device 103 correspond to, for example, a multidimensional space management section 111 in FIG. 2.

The fundamental terminology used in the description which follows will be explained next.

(1) Multidimensional Space as an Object

In the present invention, an n-dimensional space is made an object. Let the object space be V. The space V may be of any type provided that the distance is defined as described below.

(2) Distance and its Properties

In the multidimensional space V, the distance d (a, b) is defined between arbitrary points a and b which satisfies the following properties:

$$0<=d(a, b) \quad\quad 1.$$

where d(a, b)=0 only when a=b.

$$d(a, b)=d(b, a) \quad\quad 2.$$
$$d(a, c)<=d(a, b)+d(b, c) \quad\quad 3.$$

In particular, the property 3 is referred to as the triangle inequality and corresponds to the fact that the length of one side of a triangle is less than the sum of the lengths of the other two. In mathematics these properties are called the axioms of metric space. In the description which follows, we shall refer to them as the properties of distance. The present invention is applicable to any space for which distance that satisfies the properties has been defined.

(3) Object Points and a Set Thereof

We shall refer to that point in the multidimensional space V which represents an object to be retrieved as an object point. A set of object points is represented by T. The object point is generally represented by t.

(4) Specified Point

In the similarity retrieval, object points close to a point specified is retrieved. The point specified is called the specified point and is generally represented by p. It should be noted here that p is not necessarily an object point. This is because there is the possibility that the user may specify a point different from object points already stored.

(5) D-distance Neighborhood

We shall refer to a set of object points within a distance d from a specific point p as the d-distance neighborhood, d representing closeness in distance, i.e., similarity. To seek the d-distance neighborhood is one objective of the similarity retrieval.

(6) K-order Neighborhood

We shall refer to a set of k object points collected in the order of increasing distance from a specific point p as the k-order neighborhood. When p is not an object point, to seek a point closest to p is to seek the 1-order neighborhood. When p is an object point, to seek the 2-order neighborhood is to search for a point closest to that object point. To seek the k-order neighborhood is another objective of the similarity retrieval.

(7) Reference Point

We shall refer to a specific point or points selected in the multidimensional space as a reference point or points. The reference point may be either an object point or an arbitrary point. The reference point may exist outside the region where the object points exist. How to select the reference point will greatly affect the retrieval performance. The relationship of the way to select the reference point with the retrieval performance will be described later.

(8) Reference Point Distance

We shall refer to the distance from the reference point to an object point as the reference point distance. If there is no problem in performance, it is desirable from the viewpoint of simplicity and space efficiency that the reference points be small in number. However, in order to narrow down candidates for retrieval in a multidimensional space, many reference points are generally required.

FIG. 2 shows the configuration of an information retrieval system according to an embodiment of the present invention. This system comprises a multidimensional space management section 111, a database system 112, and a secondary storage unit 113. The multidimensional space management section 111 comprises a similarity retrieval section 121, an update processing section 122, and a data management section 123.

The secondary storage unit 113 stores records of retrieval objects, each record being composed of a plurality of feature parameters, and a distance index for the records. The database system 112 provides a function of making access to the records stored in the storage unit 113. The multidimensional space management section 111 performs similarity retrieval of feature parameters in a multidimensional space with a range of each feature parameter as one dimension.

The data management section 123 performs basic operations associated with processes of retrieving and updating distances and feature parameters. The similarity retrieval section 121 is responsive to a given command to seek the distance neighborhood or order neighborhood. The update processing section 122 performs processes of inserting, deleting and updating object points. Also, it serves a function of maintaining consistency, e.g., changing distances according to changes of feature parameters.

Next, a method of organizing a discretized concatenated distance index will be described for each step. The index is constructed by the update processing section 122.

First, the distance from each of a plurality of reference points to each object point is determined. We shall refer to this distance as original distance. Next, the original distance is subjected to discretization. The discretization is a process of converting continuous distance into discrete form (in general, an integer). The primary objective of the discretization is to suppress the movement of the disk head when a B-tree-like index is used. This will be described later in detail. In the first place, simple examples are given below.

EXAMPLE 1

| Original distance | Discrete distance |
| --- | --- |
| 0.0–0.1 | 0 |
| 0.1–0.2 | 1 |
| 0.2–0.3 | 2 |
| ... | |
| 0.9–1.0 | 9 |

In EXAMPLE 1, the continuous distance in the range of 0.0 to 1.0 is divided into 10 groups each having an equal width of 0.1. In this case, the original distance, whether it be 0.11 or 0.15, is represented as a discretized distance of 1.

In this manner, distance is divided into a plurality of groups by discretization. We shall refer to each group as a band. Also, we shall refer to the difference between maximum and minimum values of distance in each band as the width of it. In EXAMPLE 1, the width of each band is 0.1. Each band is allowed to have a different width.

Representing a function for converting original distance into discretized distance by γ yields discretized distance=γ (original distance)

We shall refer to this function γ as the discretization function. Using this representation in EXAMPLE 1 yields, for example

γ(0.15)=1

The discretization function must satisfy the following condition:

If $d1<=d2$, then $\gamma(d1)<=\gamma(d2)$

That is, the discretization function must be monotone increasing.

Further, we shall refer to a function for mapping points v in multidimensional space into discretized distances as a discretized distance function. Representing the reference point as s, the discretized distance function δ(v) is given by δ(v)=γ(d(s, v))

EXAMPLE 2

| Original distance | Discretized distance |
| --- | --- |
| 0.0–1.0 | 1 |
| 1.0–10.0 | 2 |
| 10.0–100.0 | 3 |
| ... | |

In this example, the bands have varying widths: 1.0, 10.0, and 90.0. Such discretization is utilized in a case where one wants to make the number of object points in each band uniform. For example, this corresponds to a case where the density of object points becomes reduced as the distance increases.

EXAMPLE 3

| Original distance | Discretized distance |
|---|---|
| 5,000,000.0–5,100,000.0 | 1 |
| 5,100,000.0–5,200,000.0 | 2 |
| 5,200,000.0–5,300,000.0 | 3 |
| 5,900,000.0–6,000,000.0 | 10 |

In this example, very great values are simplified. Even if a reference point is set at a long distance, the discretization allows it to have a simple value. The discretized distances, which are ordered quantities, can be represented as integers, offering advantages with respect to space efficiency.

In general, the discretized distance does not always satisfy the properties of distance. In the three examples shown above, the discrete distances might be called the numbers allocated to regions divided on the basis of the distance from a reference point in the order of distance beginning with the region nearest to the reference point. The objectives of the discretization are to perform information retrieval at high speed and increase the space efficiency. The discretization is also involved in clustering to be described later.

Next, a concatenated key is created by concatenating a plurality of discretized distances determined from a plurality of reference points. Let the reference points be $s1, s2, \ldots, sm$ and the original distances from the respective reference points be $d1, d2, \ldots, dm$. The discretization function may generally vary from reference point to reference point. Let the discretization functions for the reference points be $\gamma 1, \gamma 2, \ldots, \gamma m$. These functions may, of course, be the same function. The discrete distances $d1', d2', \ldots, dm'$ then become $$d1'=\gamma 1(d1)$$

$$d2'=\gamma 2(d2)$$

$$dm'=\gamma m(dm)$$

The concatenated key is logically the same as the following arrangement of those discretized distances:

$$(d1', d2', \ldots, dm')$$

For example, when each discretized distance is represented by one byte, the concatenated key is composed of m bytes. An index is created based on this concatenated key.

The index is a set of two values: concatenated discretized distance and pointer. The dictionary type order is naturally defined for the concatenated discretized distance, which is retained by the index. The methods for implementing such an index includes a B-tree.

Information concerning each object point is generally stored in the secondary storage unit 113 as a record. Information that allows access to the record is a pointer. The objective of the index is to allow fast access to information of the reference point on the basis of the concatenated discretized distances.

The advantage of concatenating distances is that the index is allowed to be single in number but not plural. A method might be considered by which an index is created for each distance. However, from the standpoint of not only performance but also space efficiency, it is greatly desirable to use the concatenated distances.

The index thus created should accurately be referred to as the discretized concatenated distance index; however, in the description that follows, it is called the discretized distance index for simplicity. For description's sake, an original distance-based index is used which is formed in a similar way to the discretized distance index and referred hereinafter to as the original distance index.

Next, a method for seeking the distance neighborhood will be described with reference to FIGS. 3 through 9. The distance neighborhood is calculated by the similarity retrieval section 121. First, a description is given of a procedure of seeking the d-distance neighborhood associated with a certain specified point p on the basis of the original distance from a reference point s. The procedure is 1. Determine $D=d(s, p)$
2. Using the original distance index, determine from a set T of object points a set T' of object points t that satisfy the condition $$D-d<=d(s, t)<=D+d \quad (A)$$

The condition (A) means that the distance between each object point t and the reference point lies in the range of D−d to D+d.

3. Calculate $d(p, t)$ for each point t in T' and determine a set of points that satisfy $d(p, t)<=d$. This set is the d-distance neighborhood to be determined.

We shall refer to the set T' in the above procedure as the set of candidate points in a sense that it contains candidates for the d-distance neighborhood. Also, the points in the set T' are referred to as candidate points.

Figure 3:
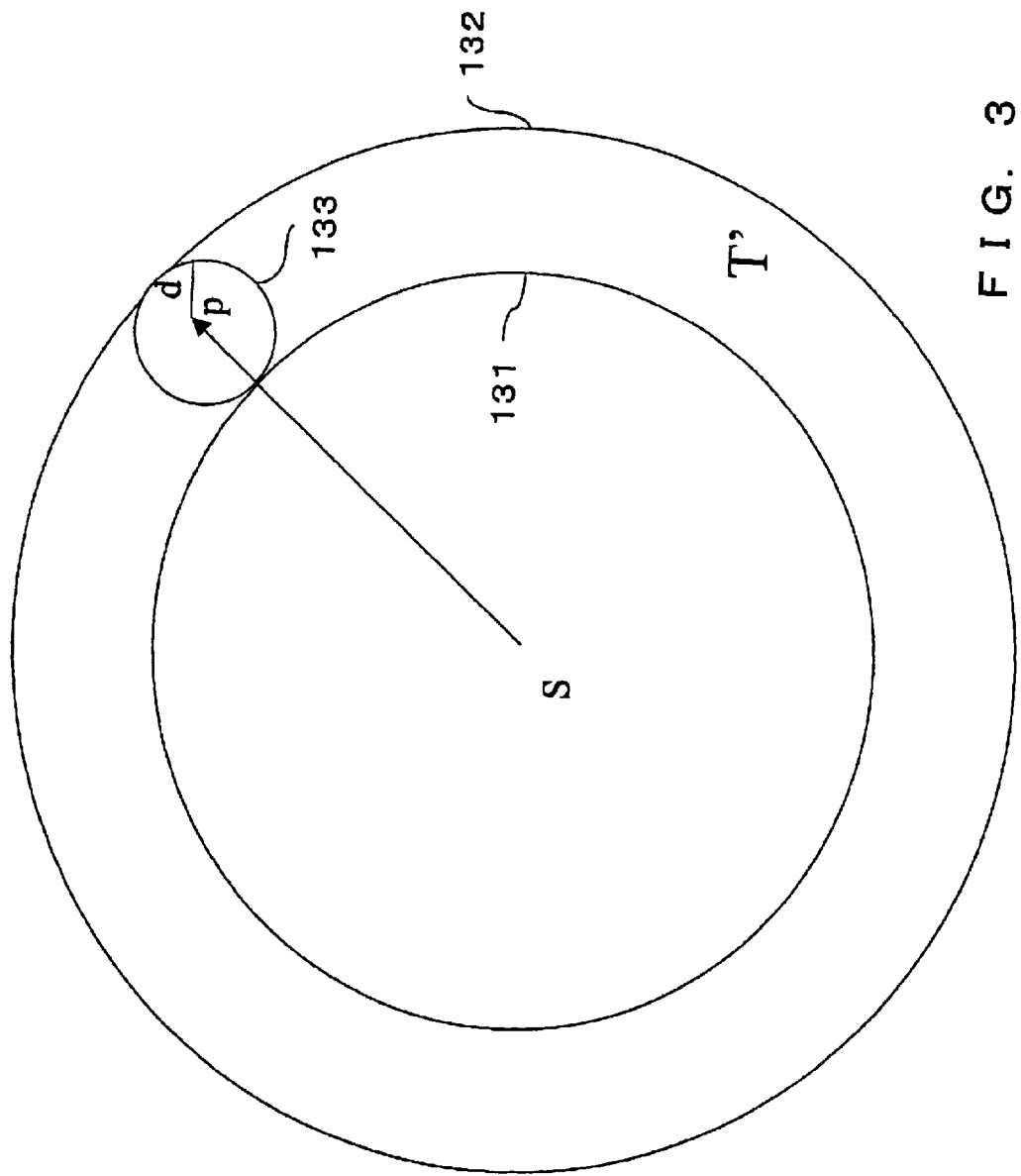
FIG. 3 shows a first set of candidate points.

FIG. 3 shows the relationship between the d-distance neighborhood and the set of candidate points in a two-dimensional space. A set of object points existing between two circles 131 and 132 is the set T' of candidate points. A set of object points within a circle 133 is the d-distance neighborhood.

Next, a description is given of a procedure of determining the d-distance neighborhood of a certain specified point p on the basis of its original distance from two or more reference points $s1, s2, \ldots, sm$. The procedure is 1. As in the case of a single reference point, determine $$D1=d(s1, p)$$

$$D2=d(s2, p)$$

$$Dm=d(sm, p)$$

2. Using the original distance index, determine from a set T of object points a set T' of candidate points as sets of points that respectively satisfy the conditions $$D1-d<=d(s1, t)<=D1+d \quad (B1)$$

$$D2-d<=d(s2, t)<=D2+d \quad (B2)$$

$$Dm-d<=d(sm, t)<=Dm+d \quad (Bm)$$

Assuming the candidate point sets that respectively satisfy the conditions (B1), (B2), ..., (Bm) to be $T1', T2', \ldots, Tm'$ yields $$T'=T1' \cap T2' \ldots \cap Tm'$$

3. Calculate $d(p, t)$ for each point t in T' and determine a set of points that satisfy $d(p, t)<=d$. This set is the d-distance neighborhood to be determined.

Figure 4:
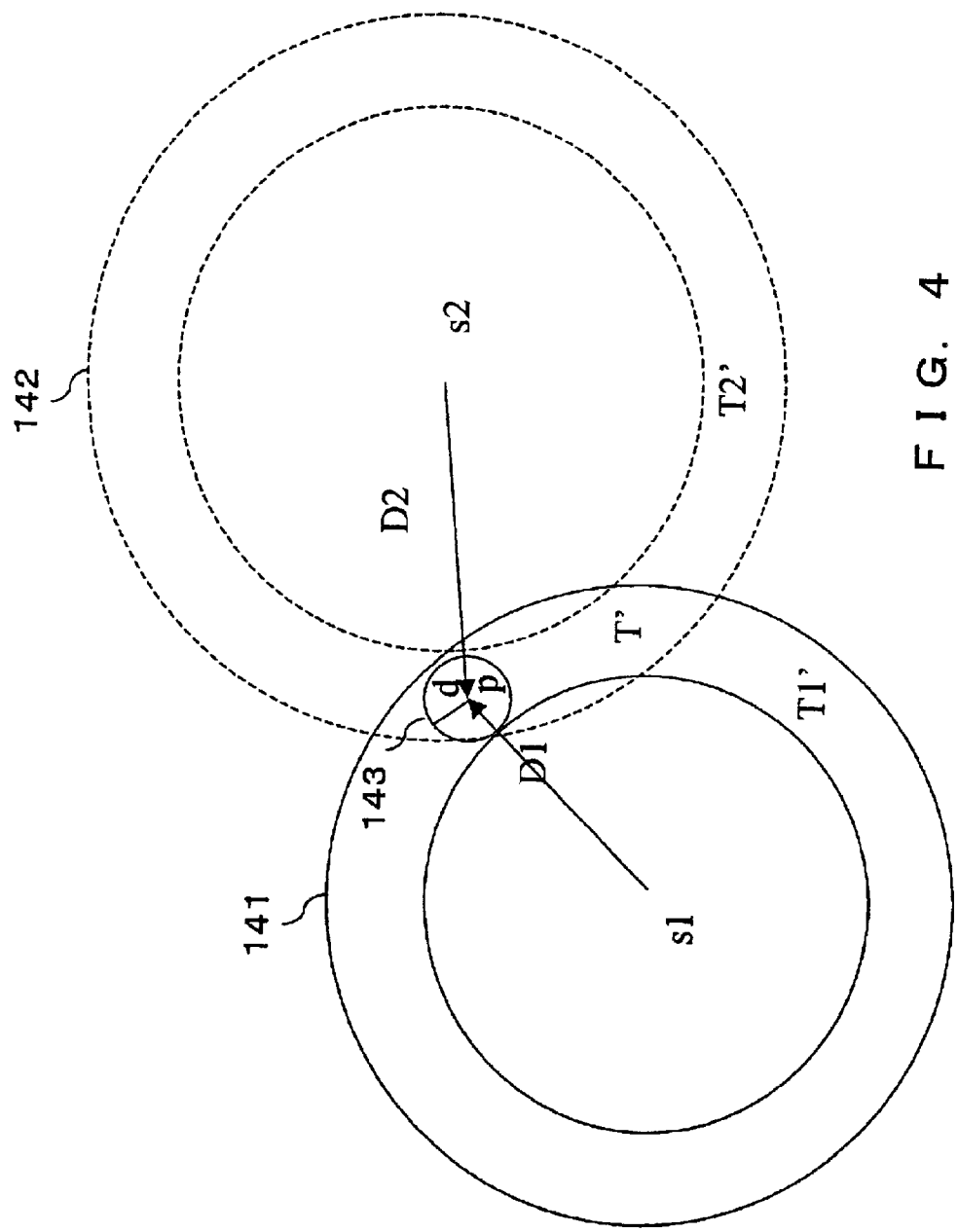
FIG. 4 shows a second set of candidate points.

FIG. 4 shows the relationship between the d-distance neighborhood and the sets of candidate points based on the original distances from two reference points in a two-dimensional space. Two doughnut-shaped regions 141 and 142 around the reference points s1 and s2 form sets T1' and T2', respectively. The region where the two regions intersect with each other forms the set T' of candidate points. A set of object points within a circle 143 is the d-distance neighborhood to be obtained.

Next, a description is given of a procedure of determining the d-distance neighborhood of a certain specified point p on the basis of its discretized distance from a reference point s. The procedure is 1. Determine D=d(s, p) Note here that d(s, p) represents the original distance.
2. Subject the upper and lower limits D+d and D−d in the condition (A) to discretization, i.e., determine $D\text{lower}=\gamma(D-d)$ $D\text{upper}=\gamma(D+d)$ where $\gamma$ is the aforementioned discretization function. Next, using the discretized distance index, determine a set T' of candidate points whose discretized distances satisfy $D\text{lower}<=\gamma(d(s,\ t))<=D\text{upper}$ Using discretized distance function $\delta(v)=\gamma(d(s,\ v))$, the condition is rewritten as $\gamma(D-d)<=\delta(t)<=\gamma(D+d)$ (C)

where $D=\delta(p)$.

3. Calculate d(p, t) for each point t in T' and determine a set of points that satisfy d(p, t)<=d. This set is the d-distance neighborhood to be obtained.

Next, a description is given of a procedure of determining the d-distance neighborhood of a certain specified point p on the basis of its discretized distances from a plurality of reference points s1, s2, . . . , sm. FIG. 5 is a flowchart for the determination of the distance neighborhood. Let the discretized distance corresponding to each reference point si (i=1, 2, . . . , m) be $\gamma i\ 0$ and the discretized distance function be $\gamma i\ 0$. The procedure is 1. As in the case of a single reference point, using the discretized distance function, in step S1, determine $D1=d(s1,\ p)=\delta 1(p)$ $D2=d(s2,\ p)=\delta 2(p)$ $Dm=d(sm,\ p)=\delta m(p)$ 2. As in the case of a single reference point, determine $D1\text{lower}=\gamma 1(D1-d),\ D1\text{upper}=\gamma 1(D1+d)$ $D2\text{lower}=\gamma 2(D2-d),\ D2\text{upper}=\gamma 2(D2+d)$ $Dm\text{lower}=\gamma m(Dm-d),\ Dm\text{upper}=\gamma m(Dm+d)$ Next, as in the case where original distances from two or more reference points are used, using the discretized distance index, in step S2 determine from a set T of object points a set T' of candidate points that simultaneously satisfy $D1\text{lower}<=\gamma 1(d(s1,\ t))<=D1\text{upper}$ $D2\text{lower}<=\gamma 2(d(s2,\ t))<=D2\text{upper}$ $Dm\text{lower}<=\gamma m(d(sm,\ t))<=Dm\text{upper}$ These conditions can be rewritten in the same manner as when the condition (C) is determined as $\gamma 1(D1-d)<=\delta 1(t)<=\gamma 1(D1+d)$ (C1)

$\gamma 2(D2-d)<=\delta 2(t)<=\gamma 2(D2+d)$ (C2)

$\gamma m(Dm-d)<=\delta m(t)<=\gamma m(Dm+d)$ (Cm)

3. Calculate d(p, t) for each point t in T' and determine a set of points that satisfy d(p, t)<=d (step S3) This set is the d-distance neighborhood to be obtained.

Figure 6:
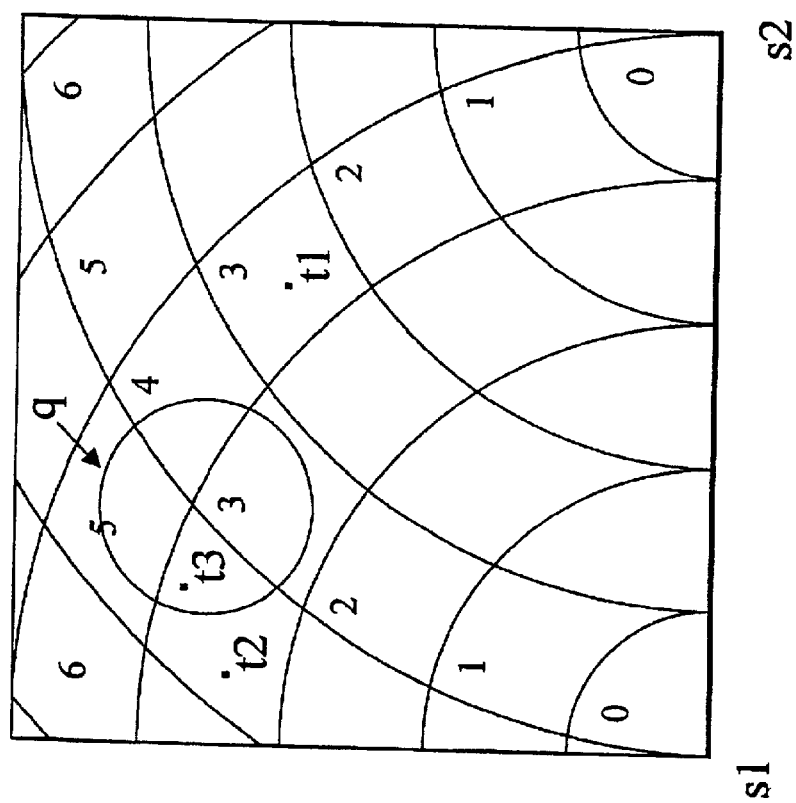
FIG. 6 shows a first space subjected to discretization.

FIG. 6 is a diagram illustrating the discretization of two-dimensional space of a square shape according to discretized distances from two reference points s1 and s2. Points t1, t2 and t3 are object points. A sphere q represents a region corresponding to the d-distance neighborhood in the similarity retrieval. Strictly speaking, a sphere in a two-dimensional space is a circle; however, it is referred herein to as the sphere. The discretized distances of the object points and the sphere are as follows:

| Object point (sphere) | Discretized distance from s1 | Discretized distance from s2 |
|---|---|---|
| t1 | 4 | 3 |
| t2 | 3 | 5 |
| t3 | 3 | 5 |
| q | 3, 4 | 4, 5 |

As for the sphere q, as shown above, its discretized distance from s1 is contained in the bands of 3 and 4 and its discretized distance from s2 is included in the bands of 4 and 5. In this case, the conditions representing the set T' of candidate points are $3<=\delta 1(t)<=4$ (D1)

$4<=\delta 2(t)<=5$ (D2)

The object point t satisfies the condition (D1) but not the condition (D2); thus, it is not contained in the sphere q. In contrast, the object points t2 and t3 both satisfy the conditions (D1) and (D2); thus, it is possible that they are contained in the sphere q. However, as can be seen from FIG. 6, it is only the object point t3 that is contained in the sphere q. This is the reason why the decision condition, d(p, t)<=d, is set up in the calculation of the d-distance neighborhood. That is, T' is merely a set of candidates to which many object points are narrowed down through filtering.

That T' has only to be examined in order to determine the d-distance neighborhood holds for all distances that satisfy the properties of distance. That is, this principle can be applied to all distances that generally satisfy the properties of distance, including not only Euclidean distances which are distances in a normal sense but also Manhattan distances to be described later. This is greatly significant in practice because various distances are used with multidimensional spaces.

However, this is difficult to understand intuitively and hence needs to be illustrated logically. To this end, it is simply required to show that a point t contained in the d-distance neighborhood of p satisfies the conditions (C), (C1), (C2), . . . , (Cm). A lemma must be to prove is as follows. Lemma: Let $\gamma(d)$ be a discretization function that satisfies if $d1<=d2$, then $\gamma(d1)<=\gamma(d2)$ (1)

Let an arbitrary point s on a multidimensional space be a reference point and an arbitrary point on the multidimensional space be p. Let the discretization distance function be $\delta(t)=\gamma(d(s,\ t))$.

At this point, an arbitrary point v within the d-distance neighborhood of p, i.e., a point v that satisfies $$d(p, v) <= d \quad (2)$$

will satisfy $$D-d <= d(s, v) <= D+d \quad (3)$$

where $$D = d(s, p) \quad (4).$$

Also, it satisfies $$\gamma(D-d) <= \delta(v) <= \gamma(D+d) \quad (5)$$

The proof of the above lemma is demonstrated as follows.
Proof: From the aforementioned property 3 of distance, we obtain $$d(s, v) <= d(s, p) + d(p, v)$$

Combining this expression with expressions (2) and (4) yields $$d(s, v) <= D+d \quad (6)$$

On the other hand, from the property 3 of distance, we obtain $$d(s, p) <= d(s, v) + d(v, p) \quad (7)$$

From the property 2 of distance, we obtain $$d(v, p) = d(p, v)$$

Combining this expression with expressions (4) and (7) yields $$D <= d(s, v) + d(p, v)$$

Substituting expression (2) into this expression and rearranging yields $$D-d <= d(s, v) \quad (8)$$

Combining expressions (6) and (8) yields expression (3). Expression (1) indicates that the function γ satisfies the property of monotonous increasing. Hence, from expression (3) we obtain $$\gamma(D-d) <= \gamma(d(s, v)) <= \gamma(D+d)$$

i.e., $$\gamma(D-d) <= \delta(v) <= \gamma(D+d)$$

Hence, expression (5) holds. (The end of proof)

Next, the method of determining a set of candidate points using a discretized distance index will be described in more detail. First, the reason for discretization will be described using such an exemplary index as shown in FIG. 7.

In FIG. 7, id corresponds to an identifier of a record that forms an object point and d1 and d2 represent distances from different reference points. For comparison with discretized distance, original distance is used here. The index corresponds to the results of sorting object points in a dictionary type order using d1 and d2. The typical example of index is a B-tree. The index, which is generally a tree structure, is described logically in FIG. 7. The pointer section is omitted. In actual similarity retrieval, access is made to a candidate record using a pointer. It is then required to check whether the similarity conditions are met using the feature parameter of the record.

Although d1 and d2 are described separately in FIG. 7, they form a concatenated key. Assume the conditions for similarity retrieval to be $$0.4 <= d1 <= 0.6 \quad (E1)$$

$$0.1 <= d2 <= 0.3 \quad (E2)$$

Then, the use of the index allows direct access to the first record to satisfy the conditions (E1) and (E2). In this example, the first record is the id=4 record (d1=0.4 and d2=0.2). Following records beginning with the id=4 record, scanning is made until it is found that the conditions (E1) and (E2) are no longer satisfied, i.e., until the id=7 record (d1=0.7 and d2=0.4) is reached. In this case, therefore, four records will be followed. One record (id=4) that satisfies the conditions (E1) and (E2) can then be found from among the four records.

Here, consider the following discretization in this example:

$$0.0 <= x < 0.4 \qquad 1$$

$$0.4 <= x < 0.7 \qquad 2$$

$$0.7 <= x < 1.0 \qquad 3$$

Figure 8:
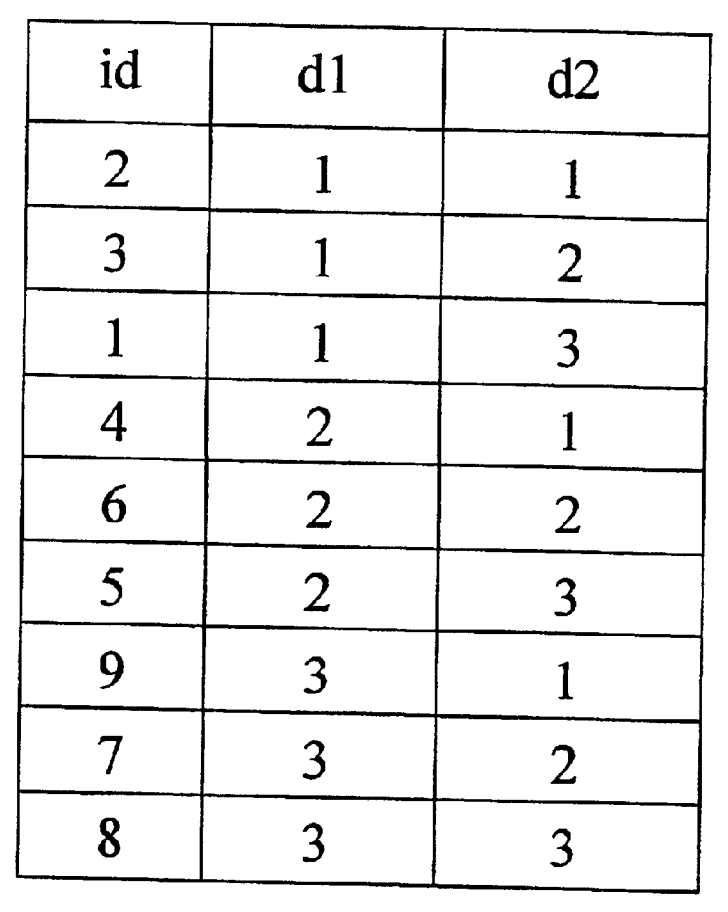

In this case, the index becomes as depicted in FIG. 8. Since the object points are rearranged in the dictionary type order of discretized distances, the index of FIG. 8 differs from that of FIG. 7 in the id order. The conditions for similarity retrieval become $$d1=2 \quad (E3)$$

$$d2=1 \quad (E4)$$

The use of the index allows direct access to the record (id=4) that satisfies the conditions (E3) and (E4). In order to make sure that there is no other record that satisfies the conditions (E1) and (E2), it is required to check the next id=6 record. Thus, a total of two records will be followed.

In this example, the index using non-discretized distances requires to follow four records, whereas the index using discretized distances allows a record that satisfies the conditions to be found by following only two records. Thus, by the discretization of distances, records can be clustered to reduce the number of records to be followed. The clustering refers to collecting data into storage areas close to one another. This advantage is a first reason for the discretization of distances.

Although, in this example, this advantage might be difficult to understand because of few records and dimensions, it will become more remarkable as the records increase in number. The reason is that, considering the conditions (E3) and (E4) as a sphere of radius d with center at a specified point representing the conditions for similarity retrieval, the possibility of following records which are not ones to be sought increases with increasing number of records contained in a band that contains that sphere.

The above example is an ideal one of discretization. That is, the case where both the conditions (E3) and (E4) are represented by equations rather than by inequalities is ideal. In contrast, when the conditions for similarity retrieval are represented by inequalities $$2 <= d1 <= 3 \quad (E5)$$

$$1 <= d2 <= 2 \quad (E6)$$

records that satisfy the conditions are ones of id=4, 6, 7, and 9; however, the intervention of records of id=5 and 8 that do not satisfy the conditions is involved. This will never occur in the case of equations alone.

Considering this situation in terms of a sphere representing the conditions for similarity retrieval, that the conditions contain signs of inequality means that the sphere spans two or more bands. It is therefore desirable to set the sphere not to span bands. To this end, it is basically required to set the bandwidth large to some degree. Further, the following measures will be considered.

In a multidimensional space, a threshold radius is expected to be frequently set up on similarity conditions. For example, this corresponds to a case where, outside the threshold radius, similarity is not considered to exist. In this case, since searching is performed within the threshold radius, a distance two or more times the threshold radius is used as the unit of discretization. The distance two times the threshold radius represents the minimum condition for allowing the sphere to be contained in a band. In general, therefore, a longer distance is used as the unit of discretization.

In practice, however, even the band width thus increased will not perfectly prevent the sphere from spanning bands. It is thus required to consider some processing to be performed in that event. In the case of similarity retrieval to satisfy the conditions (E5) and (E6), two basic processes are considered: sequential retrieval and divided condition retrieval.

First, the sequential retrieval is a method which, after access has been made to the first record that satisfies the conditions, searches through records sequentially until it is known that the conditions will be satisfied no more.

In the above example, direct access is made to the first record (id=4, d1=2, d2=1) that satisfies the conditions (E5) and (E6) and then records are followed in sequence for which a decision is made as to whether the conditions are met. The processing is stopped when the id=7 record has been checked because the condition (E5) is not met for the subsequent records. The reason is that the d1 values are sorted in the ascending order of magnitude and, since the condition (E5) is not met at that point, the subsequent records will also not meet the condition (E5).

The divided condition retrieval is a method which divides conditions containing signs of inequality into conditions consisting of equations and retrieves records based on individual divided conditions. In the above example, the conditions (E5) and (E6) are divided into four conditions $d1=2$ and $d2=1$   (E7)

$d1=2$ and $d2=2$   (E8)

$d1=3$ and $d2=1$   (E9)

$d1=3$ and $d2=2$   (E10)

Direct access is made to each of records which satisfies a respective one of the conditions using the index and then records are traced until a record that satisfies none of the conditions is reached.

The advantage of this method is that unnecessary records which are traced in the sequential retrieval method can be skipped over. This advantage will become more remarkable as the number of records increases. However, the sequential retrieval also has a merit. In the similarity retrieval in a multidimensional space, the range of conditions and the number of records increase and hence, in general, the divided condition retrieval is effective. However, since the index is a tree structure as exemplified by a B-tree, direct access requires to follow the tree structure from its root. Thus, if the range of retrieval is narrow, the sequential retrieval may be more effective.

With these matters taken into consideration, the two methods can be combined into one which involves the divided condition retrieval using some preceding conditions of given conditions and the sequential retrieval using the subsequent conditions. Specifically, retrieval is switched from the divided condition retrieval to the sequential retrieval when the range of the index for retrieval becomes narrowed down.

To explain this method, such an index as shown in FIG. 9 is presented. In FIG. 9, d1, d2 and d3 represent discretized distances. Similarity conditions are set up such that $2 < -d1 <= 3$   (E11)

$d2=2$   (E12)

$1 <= d3 <= 2$   (E13)

Only the two preceding conditions (E11) and (E12) are divided into $d1=2$ and $d2=2$   (E14)

$d1=3$ and $d2=2$   (E15)

Direct access is made to the id=14 record using the condition (E14) and then sequential access is made to records until a record is reached which does no meet the conditions (E11), (E12) and (E13), i.e., until the id=16 record is reached. In the same manner, direct access is made to the id=22 record using the condition (E15) and then sequential access is made to records until a record is reached which does no meet the conditions (E11), (E12) and (E13), i.e., until the id=25 record is reached.

In this example, even with sequential retrieval, at most three records are merely followed in each sequential process. It is apparent that this method is faster than the divided condition retrieval using all the conditions.

Here, the problem is when to switch from the divided condition retrieval to the sequential retrieval. This cannot be determined unconditionally because the amount and distribution of data are involved. With discrete distances of d1, d2, ..., dn, it is appropriate that the divided condition retrieval is performed on the basis of conditions except a condition associated with dn and the sequential retrieval is performed on the basis of the condition associated with dn. The alternative is that the divided condition retrieval is performed on the basis of conditions except conditions associated with dn-1 and dn and the sequential retrieval is performed on the basis of the conditions associated with dn-1 and dn. In general it appears appropriate to perform the sequential retrieval using conditions associated with the last some discretized distances.

Figure 10:
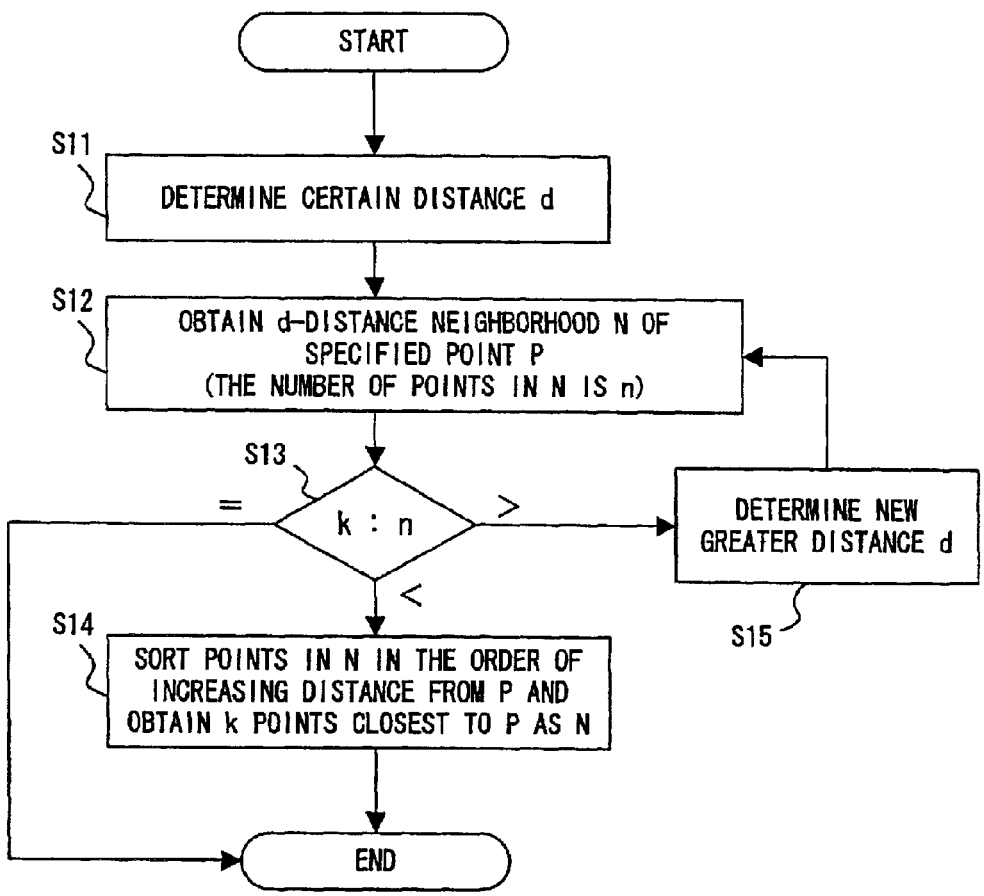
FIG. 10 is a flowchart for the calculation of order neighborhood.

Next, a description is given of a method for determining the order neighborhood, which is computed by the similarity retrieval section 121. We shall refer to a set of k object points collected in the order of increasing distance from a specific point p as the k-order neighborhood. FIG. 10 is a flowchart for the order neighborhood calculation procedure of obtaining the k-order neighborhood of the specified point p. The procedure is 1. Determine a certain distance d appropriately (step S11).
2. Obtain d-distance neighborhood N of the specified point p in accordance with the aforementioned method (step S12).
3. According to the number, n, of points contained in the resultant d-distance neighborhood N, perform the following processes (step S13).

3.1 When n>k+1, sort the points contained in N in the order of increasing distance from p and obtain a set of k points closest to p as the k-order neighborhood.

3.2 When n=k, take N as the k-order neighborhood.

3.3 When n<k, determine a new distance greater than distance d and take it as the distance d (step S15). A return is made to step S12 and the procedure is repeated.

The flowchart of FIG. 10 is depicted in the form of a simple algorithm in order to make the process flow readable. However, this procedure includes a fruitless process of retrieving the already determined d-distance neighborhood again. In order to avoid such fruitlessness, after the determination of d-distance neighborhood with d set at da, with d newly set at db (db>da), a differential set of db-distance neighborhood and da-distance neighborhood is simply determined as opposed to determining the db-distance neighborhood. In this case, assuming the number of points in the da-distance neighborhood to be na (na<k), (k−na) points have only to be extracted from the differential set; nevertheless, when k points are not still determined, the same process is repeated.

Thus, the determination of the k-order neighborhood generally involves determining the d-distance neighborhood repeatedly, which results in a string of distances d:

d(1), d(2), . . . , d(i), . . .

Thus, how to determine the string of distances becomes a problem. Although various methods therefor are considered, a method based on arithmetical progression and a method based on geometrical progression are described here.

First, with the arithmetical progression-based method, the i-th distances d(i) are given by $$d(i)=d(1)*i$$

where d(1) is the initial value of the distance d. This method, while being natural, has the possibility that the process is repeated many times when there is no object point near by.

In contrast, with the geometrical progression-based method, the distances d(i) are given by $$d(i)=d(1)*a^{(i-1)}$$

If a=2, the distances d will be increased progressively by a factor of two (d(1), 2d(1), 4d(1), 8d(1), . . . ). With this method, since the distances increase exponentially, the number of times the process is repeated is significantly reduced even in the case where there is no object point near by. However, there is the possibility that the process for a certain distance may involve more points than is necessary.

Figure 11:
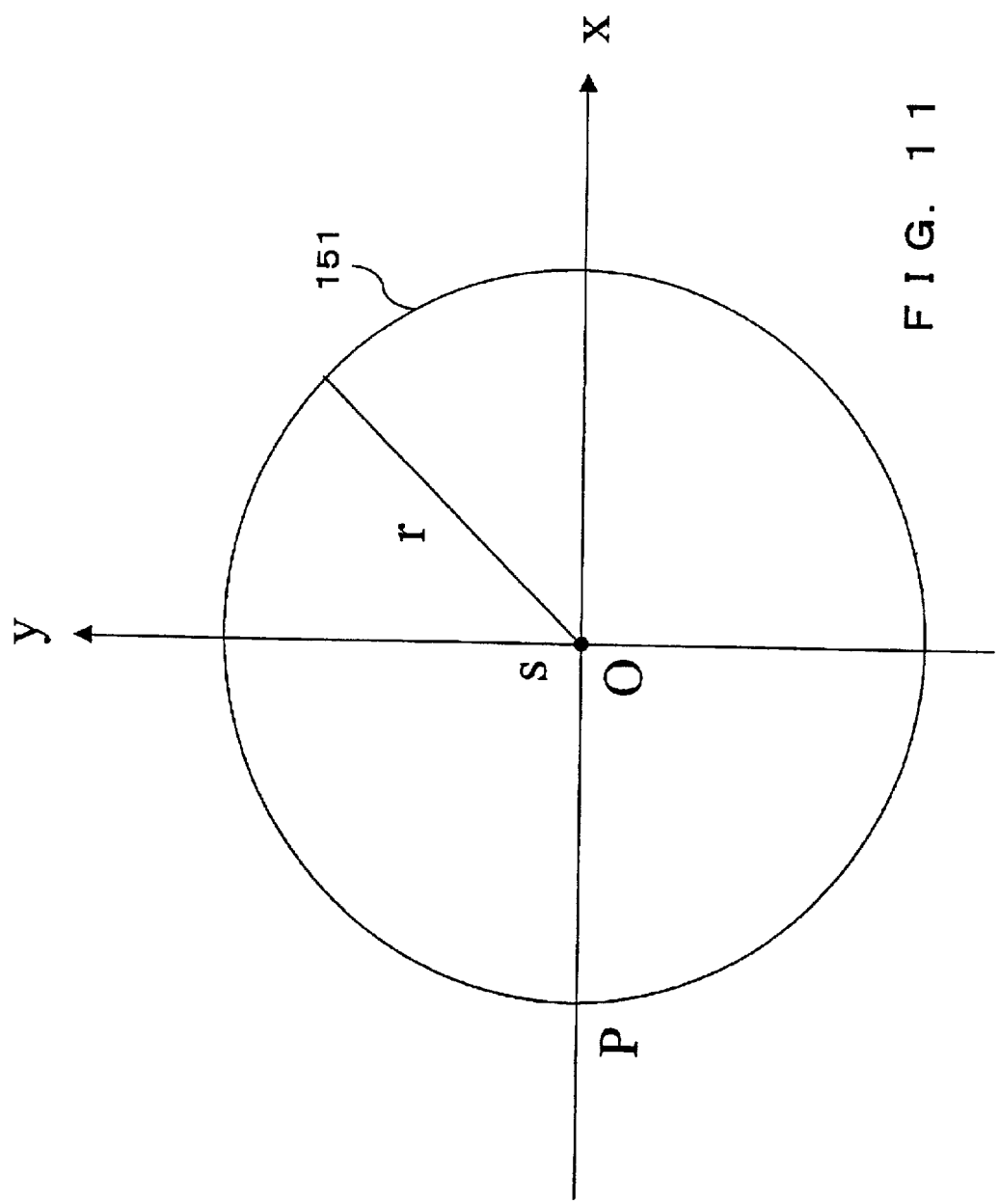
FIG. 11 shows a first distribution of object points.

Next, how to determine a reference point in a multidimensional space will be described. Where to take the reference point significantly affects the performance of similarity retrieval. As an extreme example, consider the case where all the object points in a two-dimensional space are uniformly distributed on a circle 51 of radius r with center at the origin O as shown in FIG. 11.

First, when the reference point s is taken at the origin O, all the elements in the distance index are collected at distance r, in which case the object points cannot be narrowed down. Thus, the distance from specified point p has to be calculated for all the points.

Next, when the reference point s is set at the intersection P of the x-axis and the circle 151, the distance values range from 0 to 2r.

When the reference point s is taken at a point distance d from the origin O between the point P and the origin O, the distance values lie in the range of r−d to r+d. The smaller the distanced from the origin O, the narrower the range becomes. The range becoming narrower is not preferable as suggested by the case where the reference point s is taken at the origin O. The reason is that a set T' of candidate points, when determined to create a distance index, comes to contain too many points for the index to attain its function of narrowing down the retrieval range.

In order to make the distance values extend over a wide range, it is preferable to take the reference point s at the point p or far away from it on the x-axis. Incidentally, even if the reference point s is taken at a point far away from p, the distance values will still range from 0 to 2r as in the case where the reference point is taken at P.

Figure 12:
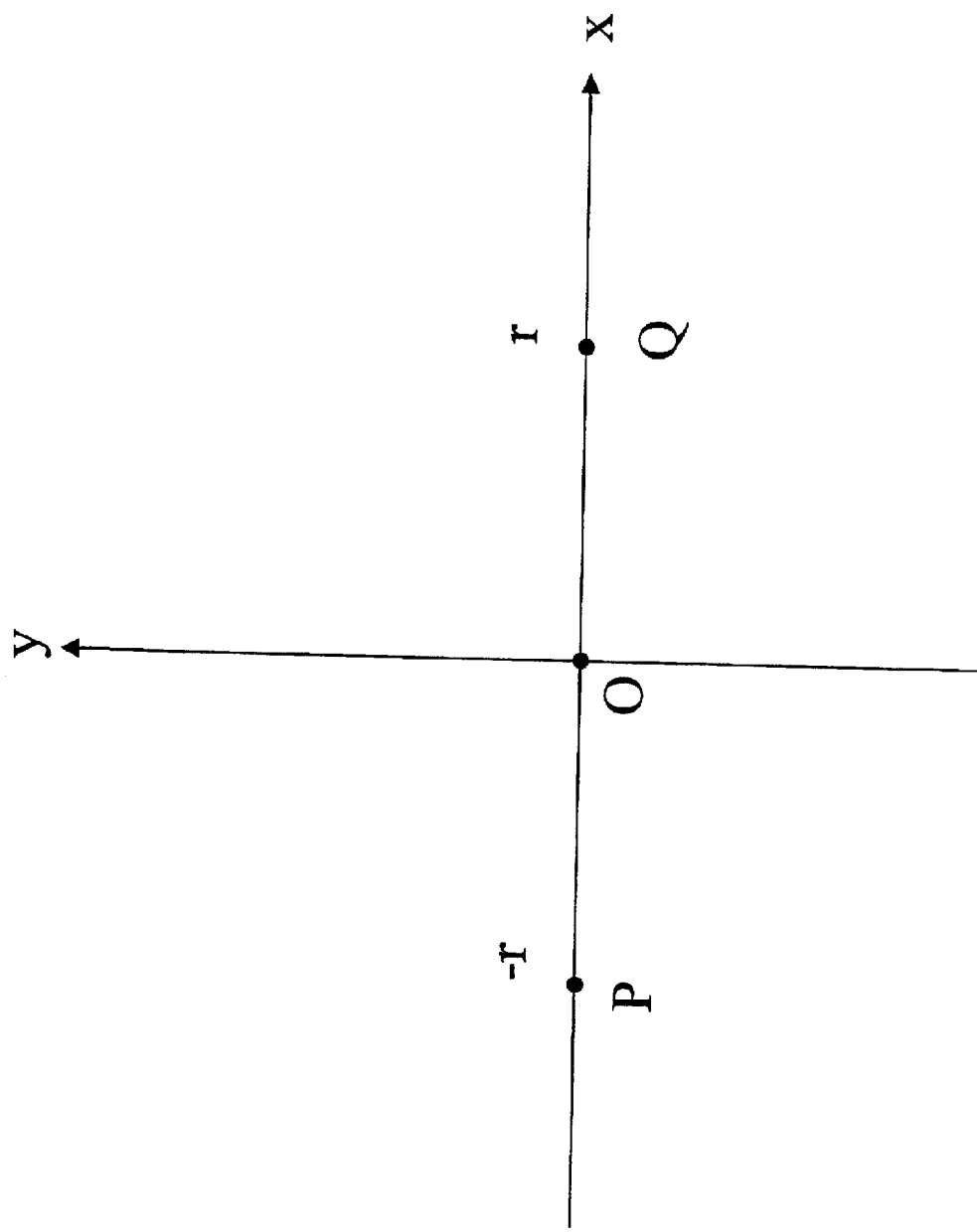
FIG. 12 shows a second distribution of object points.

As another example, consider the case where object points are uniformly distributed on a line connecting points P and Q as shown in FIG. 12. Let the distance between O and p and the distance between O and Q be equal to r. In this case as well, the performance of similarity retrieval depends greatly on the way to select the reference point.

First, an undesirable example is adduced. When a point far away from the origin O on the y-axis is taken as the reference point s, all points on the line PQ will be at substantially the same distance from the reference point.

Conversely, a desirable example is to take the reference point at the point P or Q or at a point on an extension of the line PQ. In this case, the distance values are uniformly distributed over the range of 0 to 2r.

Taking a point between P and Q as the reference point and letting its coordinates be (d, 0) where 0<=|d|<r, the distance values will be distributed over a range the width of which is r+d. This width is less than 2r. Even when the reference point is set at a point that does not lie on the x-axis, the width of the range of distance values will still become less than 2r.

Thus, it is preferable to set the reference point at P or Q, which are points at both ends of the line PQ, or at a point on an extension of that line. Thus, the most suitable reference point varies according to the distribution of object points in a multidimensional space. Knowing how the object points are distributed as in the case of FIG. 11 or 12 will also make it possible to determine the most suitable reference point.

In general, however, in many cases it is expected to be difficult to determine the most suitable reference point regardless of whether the distribution is known or not. With actual data, it is expected that the object points may increase or decrease in number, or changes in the features of the object points may require changes in their position. Changing the reference point on all such occasions could complicate the processing. If, when the system is commercially available, such setting were imposed on users, they might well think it troublesome.

Consider which way to set the reference point even through it is not the most suitable is generally desirable. The above examples suggest the following two requests:

1. It is desirable to take the reference point outside the range in which object points are distributed.
2. It is desirable to allow the distance values to extend over a wide range.

Taking the request 1 too seriously, from a sense that the reference point is to be taken outside the range in which the object points are distributed, it follows that the reference point is to be set at the outermost point in a multidimensional space no matter how object points are distributed. For example, with a multidimensional space in the form of a super cube, a vertex of the cube is desirable as the reference point.

Considering the above points into consideration, vertexes and points on an extension of a straight line are listed as candidates for the reference point. However, since the requests 1 and 2 are not necessarily the best, the ways to take the reference point are merely exemplary.

First, a description is given of the case where a vertex is selected as the reference point. In a space consisting of a super cube each side of which is a in length, for example, the following vertexes are selected as the reference points:

(0, 0, 0, . . . , 0)
(a, 0, 0, . . . , 0)
(0, a, 0, . . . , 0)
(0, 0, 0, . . . , a)

When the reference points are set at the vertexes of an n-dimensional super cube, the width of the distribution range of distance values becomes maximum and equals the diameter of that cube, $a\sqrt{}$.

Next, a description is given of the case where the reference point is set on an extension of a straight line. Suppose a certain straight line and project object points onto it. At this point, select a straight line such that the distribution range of the projected object points is maximum. Take the reference point outside the distribution range. This example includes the example of FIG. 12.

When a plurality of reference points is taken, a plurality of such straight lines is selected. In this case, the second and subsequent straight lines do generally not necessarily show a maximum distribution range; however, they should be selected so that the distribution range becomes as wide as possible independently of the previously selected straight line or lines.

The method of taking the reference points at vertexes can also be regarded as taking the reference points at ends of diagonal lines of a super cube. For example, the origin (0, 0, . . . , 0) corresponds to a point at the end of the diagonal line connecting the origin and point (a, a, . . . , a). The point (a, 0, 0, . . . , 0) corresponds to the point at one end of the diagonal line connecting that point and point (0, a, a, . . . , a). In addition to taking the reference points at the vertexes, they may be taken on extensions of these diagonal lines.

Here, where to take the reference point on a straight line becomes a problem. One candidate is a point which, like a vertex, is present at one end of the distribution range. Another candidate is a point on an extension of the straight line. Still another candidate is the point at infinity on the extension.

Bring the reference point near to an infinitely far point on the extension of a straight line results in a spherical surface centered at the reference point approximating a plane. With the reference point set at the point at infinity, the spherical surface centered at that point will become a plane. That is, a space becomes divided into two or more bands by a plane perpendicular to a straight line.

In this case, since the original distance becomes infinite, handling needs care. To define discrete distances, object points are projected onto a straight line and the range of projections is determined. Suppose the projections are distributed between points P and Q. Then, it is required to divide the line PQ with n points: P0 (=P), P1, P2, . . . , Pn–1, Pn (=Q) and, with projected points of object points t on the straight line as t', to redefine the discretized distances as follows:

| Position of t' distance | Discretized |
| --- | --- |
| P0–P1 (including P1) | 0 |
| P1–P2 (including P2 but not P1) | 1 |
| P2–P3 (including P3 but not P2) | 2 |
| Pn-2–Pn-1 (including Pn-1 but not Pn-2) | n-2 |
| Pn-1–Pn (including Pn but not Pn-1) | n-1 |

As a special case, a coordinate axis may be chosen as a straight line and divided in the above manner. This method will be described later in detail as a projection-based discrete concatenated distance index.

As described previously, the principles of the invention are applicable to any distance which satisfies the property of distance. In general, the so-called Euclidean distance is frequently assumed. It is thus difficult to image other distance than the Euclidean distance. As such distance, the Manhattan distance which is used frequently in addition to the Euclidean distance will be described below.

Figure 13:
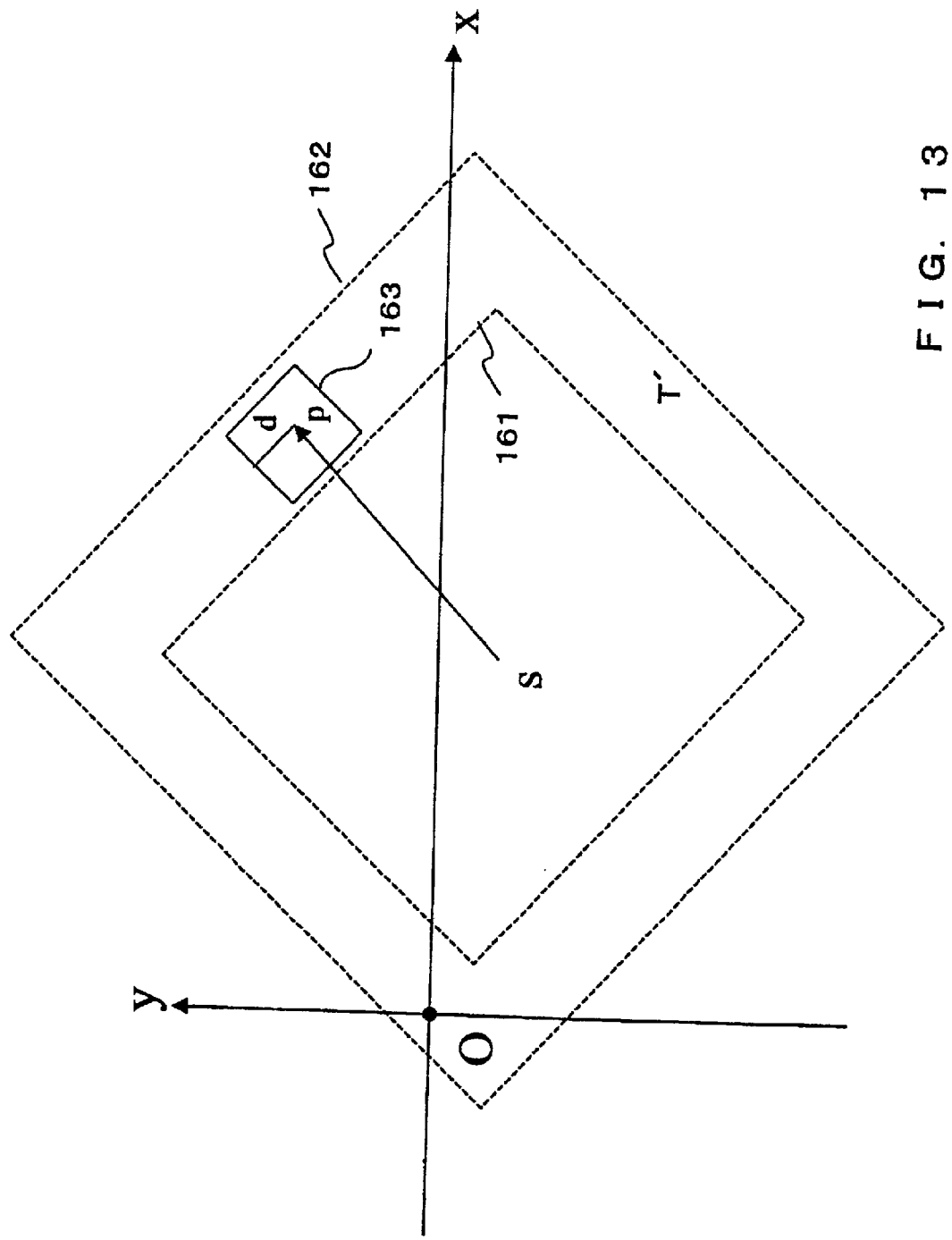
FIG. 13 shows a third set of candidate points.

FIG. 13 illustrates the relationship between d-distance neighborhood and a set of candidate points when the Manhattan distance is used and corresponds to FIG. 3 which is based on the Euclidean distance. In the Manhattan distance in a two-dimensional space, the distance between two points (x1, y1) and (x2, y2) is represented by $$|x1-x2|+|y1-y2|$$

This distance corresponds to actual distance to go from a point to a point in the case where streets are constructed in a check pattern as in Manhattan. The Manhattan distance, also called the L1 distance, is used in integrated circuits as well in which interconnect lines are parallel to the x-axis and y-axis. In contrast, the Euclidean distance, also called the L2 distance, is represented by $$(|x1-x2|^2+|y1-y2|^2)^{(1/2)}$$

In general, the Lm distance is defined by $$(|x1-x2|^m+|y1-y2|^m)^{(1/m)}$$

and satisfies the property of distance.

Accordingly, the present invention is also applicable to the Lm distance. In practice, however, the L1 distance and the L2 distance, i.e., the Manhattan distance and the Euclidean distance, are frequently used.

In FIG. 13, a set of object points contained in the intervening region between two squares 161 and 162 forms a set T' of candidate points. A set of object points contained in the square 163 forms the d-distance neighborhood. Using the Manhattan distance, a region represented as a circle in Euclidean distance becomes a square. Points at the same distance from the reference point swill be put on the sides of the square.

Next, similarity retrieval using projection-based discrete concatenated distance index will be described. With this method, the way to determine the original distance differs from with the aforementioned discrete concatenated distance index. The other processes remain basically unchanged.

In the aforementioned method, the discretized distances were determined on the basis of distances from the reference points to the object points; in this method, a reference line is used to determine distances. First, a specific line in a multidimensional space is selected as a projection reference line. It is not required that object points lie on the projection reference line.

Next, a specific point s on the selected projection reference line is selected, which is referred to as the projection reference point in distinction from the previously defined reference point. A point resulting from projection of an object point onto the projection reference line is referred to as the object projected point. The distance from the projection reference point s to the object projected point is referred to as the projection reference point distance.

The projection reference point distance is represented by original distance. It is also possible to select two or more projection reference lines. Also, it is possible to use two types of discretized distances in combination; that is, some discretized distances are determined based on the normal reference point and the other discretized distances are determined based on the projection reference point. Although there is a problem of how to select the projection reference line and the projection reference point, they can be determined in the same way as the reference point is determined.

When distances from the reference point s are used, the necessary condition for allowing object points t to be contained in a sphere is, using discretized distance function $\delta(t)=\gamma(d(s, t))$ and with $D=\delta(p)$, $$\gamma(D-d) <= \delta(t) <= \gamma(D+d) \quad (F1)$$

Here, let L be the projection reference line, s be the projection reference point, and the projected point t' of point t onto L be represented by $$t'=proj(t, L)$$

Then, the discretized distance function can be written as $$\delta(t)=\gamma(d(s, proj(t, L)))$$

Using this function, the condition under which, when the projection reference point is used, object points t are contained in a sphere becomes exactly the same as the condition (F1). Therefore, the use of either the reference point, the projection reference point, or both in determining the discretized distance allows the d-distance neighborhood to be determined in the aforementioned way.

Figure 14:
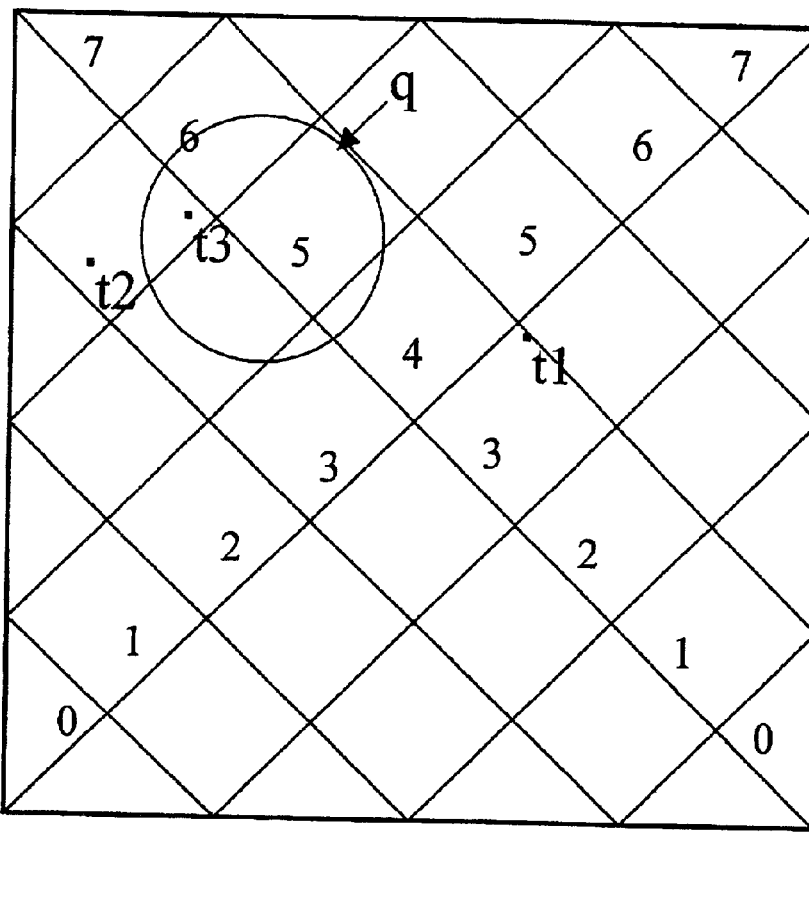
FIG. 14 shows a second space subjected to discretization.

FIG. 14 shows the discretization of the two-dimensional space of FIG. 6 using the projection reference line. The diagonal extending from s1 to the upper right and the diagonal extending from s2 to the upper left are selected as the projection reference points. The points s1 and s2 form the projection reference point.

Figure 15:
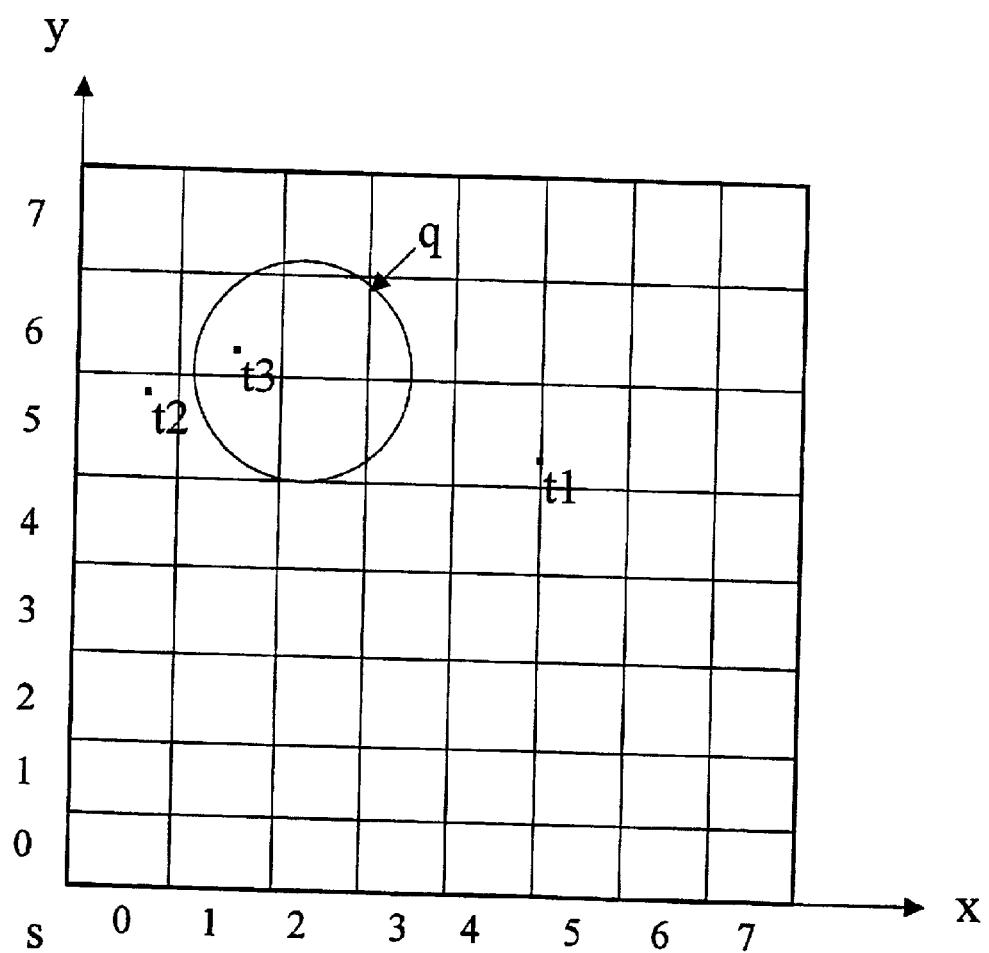
FIG. 15 shows a third space subjected to discretization.

Using the coordinate axes as the projection reference lines in place of the diagonals, the space becomes descretized as depicted in FIG. 15. Here, the x-axis and the y-axis are used as the projection reference lines. For either of the coordinate axes, the origin s is used as the projection reference point.

Figure 16:
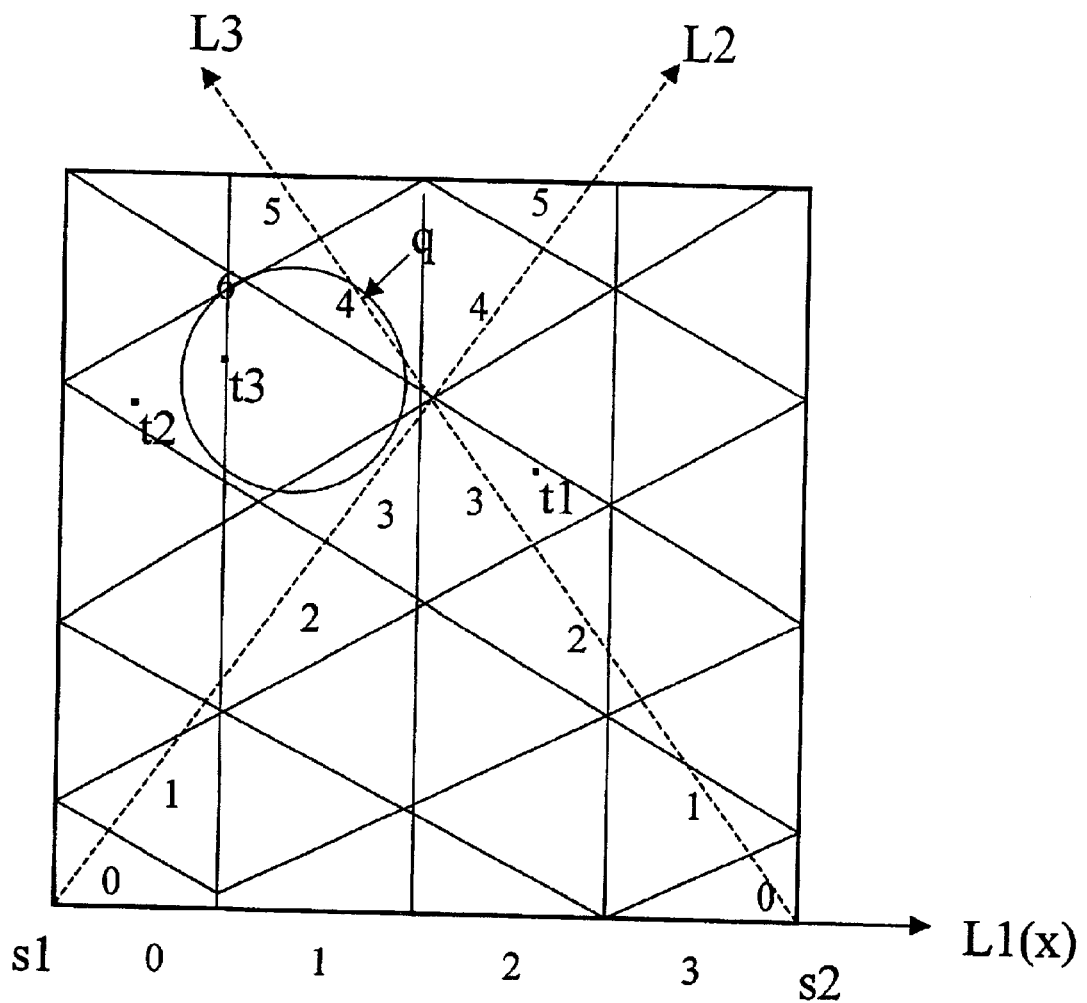
FIG. 16 shows a fourth space subjected to discretization.

FIG. 16 shows another discretization method using three projection reference lines. Here, a straight line L1 that corresponds to the x-axis and two broken straight lines L2 and L3 are used as projection reference lines. Each of L1 and L2 intersects with L3 at an angle of 60°. The projection reference points on L1, L2 and L3 are s1, s1, and s2, respectively.

Thus, even with two-dimensional space it is possible to define three or more discretized distances, thereby making the filtering of candidate points more easy. However, since increasing the number of discretized distances involves additional overhead, it is required to select suitably the number of discretized distances according to data circumstances at that point. In FIGS. 14, 15 and 16, only distances from the projection reference points are used; however, as described previously, they may be used together with the distance from the normal reference point.

Next, how to produce a distance index using bit patterns (bit pattern index) and how to determine d-distance neighborhood using that index will be described. On the basis of information concerning discretized distances obtained according to the method described so far, bit patterns indicating distances are produced and then an index is produced using them. In this case, an existing index such as a B-tree is not necessarily used and bit patterns are appended to individual records. The procedure of producing a bit pattern for each object point is as follows:

Assume that the distance from one reference point to an object point is d and the bit pattern is composed of m bits. When a1<a2< ... <am−1, the discretized distance is defined as follows:

| Band | Discretized distance d' |
|---|---|
| d < a1 | 0 |
| a1 <= d < a2 | 1 |
| a2 <= d < a3 | 2 |
| am−2 <= d < am−1 | m−2 |
| am−1 <= d | m−1 |

Each distance bit pattern is produced by setting the d'-th bit of m bits. In this case, the d'-th bit is set to one and the other bits are set to zero. Distance bit patterns corresponding to distances from two or more reference points are concatenated, thereby producing the overall bit pattern (concatenated bit pattern) for one object point.

FIG. 17 shows bit patterns for the three object points t1, t2 and t3 shown in FIG. 6. In this case, the bit pattern of discretized distance d1 from the reference point s1 and the bit pattern of discretized distance d2 from the reference point s2 are concatenated to produce the bit pattern for one object point. The bits in the bit pattern are counted from left to right as bit 0, bit 1, ...

In this example, m is set to 8, that is, basically the bit pattern consists of eight bits. For the object point t1, since d1=4 and d2=3, bit 4 in the d1 bit pattern and bit 3 in the d2 bit pattern are both set to one. The same holds for the object points t2 and t3.

Figure 18:
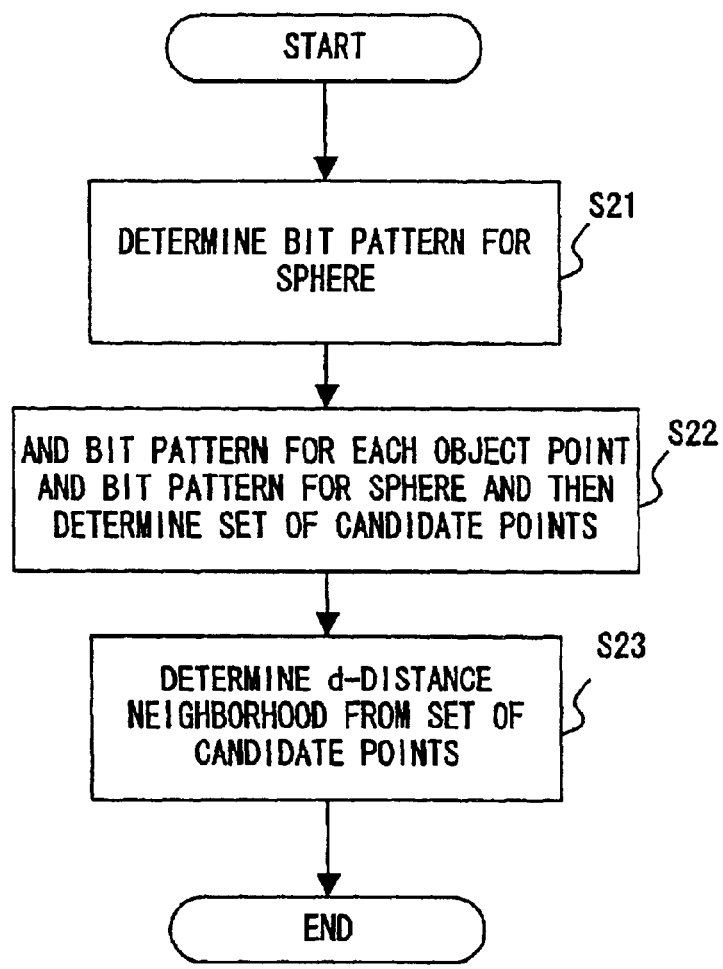
FIG. 18 is a second flowchart for the calculation of distance neighborhood.

FIG. 18 is a flowchart for the distance neighborhood calculation using such bit patterns. The procedure is as follows:

1. Production of Bit Pattern for Sphere

When the discretized distances of bands which intersect a sphere representing the d-distance neighborhood are in the range of d'lower to d'upper, the d'lower-th to d'upper-th bits are set, producing each distance bit pattern. Further, distance patterns based on distances from two or more reference points are concatenated, whereby the overall bit pattern for the sphere is produced (step S21).

Figure 19:
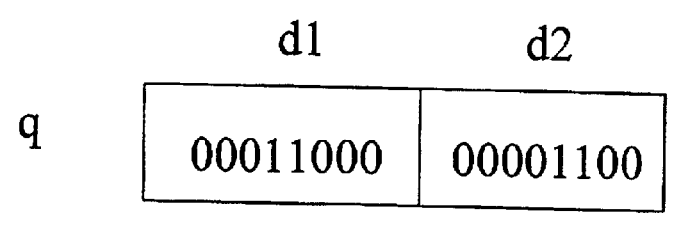

FIG. 19 shows the bit pattern for the sphere q shown in FIG. 6. Since the sphere spans the bands in which d1=3 and 4 with respect to the discretized distance d1 from the reference point s1, bit 3 and bit 4 in the d1 bit pattern are set. On the other hand, with respect to the discretized distance d2 from the reference point s2, the sphere spans the d2=4 and 5 bands; thus, bit 4 and bit 5 in the d2 bit patterns are set.

2. Matching Based on Logical Products and Filtering

For corresponding distance bit patterns in the bit pattern for the sphere and the bit pattern for each object point, two corresponding bits are ANDed (step S22). With respect to all the distances (d1 and d2) of an object point, when any of the logical products of corresponding bits is 1, there is the possibility that the object point is contained in the sphere; thus, that object point is added to the set T' of candidate points. Conversely, when the logical products are all 0s, the object point will not be contained in the sphere; thus, it is not added to T'. In this manner, filtering of object points is performed, i.e., the object points are narrowed down to candidate points.

The logical products of corresponding bits in the bit pattern for each object point shown in FIG. 17 and the bit pattern for the sphere shown in FIG. 19 are shown as follows:

|         | d1       | d2       |
|---------|----------|----------|
| t1 AND q | 00001000 | 00000000 |
| t2 AND q | 00010000 | 00000100 |
| t3 AND q | 00010000 | 00000100 |

In this case, the logical products of corresponding bits for t1 and q contain 1 for d1 but not for d2; thus, we can see that the object point t1 is not contained in the sphere q. From FIG. 6 as well, it is sure that the object point t1 is not contained in the sphere q. In contrast, for t1 and t3, the logical products for both d1 and d2 contain 1; thus, it is possible that they are contained in the sphere. The object points t2 and t3 are therefore added to the set of candidate points. In calculation efficiency, the logical products are taken from left to right in the bit patterns and, when even one distance for which all the logical products are 0s appears, the processing is stopped.

3. Calculation of Distance

For each object point t which has been left in the candidate point set T' through filtering, the distance d(p, t) from the specified point p is calculated and a set of object points for which d(p, t)<=d is determined (step S23). This set is the d-distance neighborhood to be determined. In the example of FIG. 17, as can be seen from FIG. 6 as well, only the object point t3 will be left in the d-distance neighborhood.

The bit pattern index has advantages of requiring less storage capacity and providing faster retrieval in comparison with the discrete concatenated distance index.

The previously described discrete concatenated distance index stores only the discretized distances and pointers. In order to acquire the feature parameters of object points, therefore, it is required to make access to the feature parameters through the use of the pointers. In general, there is the possibility that the secondary storage unit may store information of object points in locations apart from that for the index. There is also the possibility that pieces of information of the object points may be stored in different locations. Such storage methods would cause the disk head to move in all directions, which might adversely affect the performance of the system.

One way to prevent this will be to append not only the discretized distances and pointers but also all or part of the feature parameters to the index. According to such a method, the use of the index alone allows feature parameters of each object point to be acquired. Further, the distance between each object point and the specified point can also be calculated. Clustering of index information could provide fast processing.

Next, an example of constructing a discrete concatenated distance index by a relational database will be described. Here, it is supposed that each record has 64 feature parameters each of which is represented by a 4-byte floating-point number. Each feature parameter is in the range of 0 to 1. In this case, the number of dimensions of the multidimensional space is 64.

Figure 20:
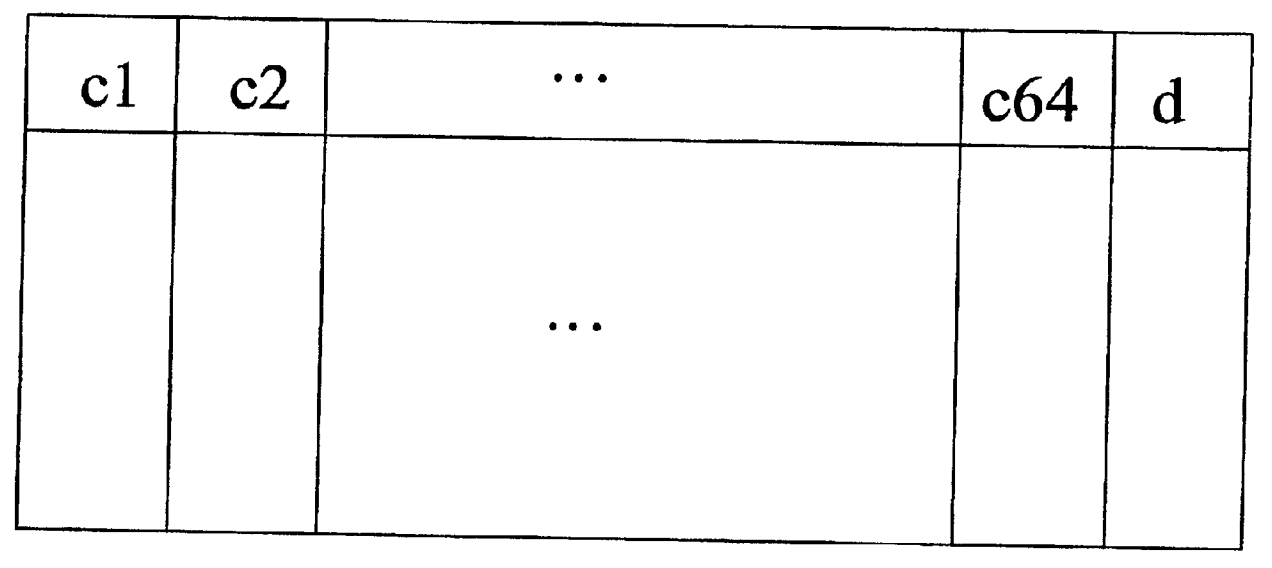

Those feature parameters can be stored in the secondary storage unit in the form of such a table as shown in FIG. 20. Here, feature parameter 1, feature parameter 2, . . . , feature parameter 64 are stored in fields c1, c2, . . . , and c64, respectively. Also, 64 reference points s1, s2, . . . , and s64 are set as follows:

s1=(1, 0, 0, . . . , 0)
s2=(0, 1, 0, . . . , 0)
s3=(0, 0, 1, . . . , 0)
s64=(0, 0, 0, . . . , 1)

The distance di from the i-th reference point is calculated for each object point t and the discretized distance d'i is calculated as follows:

$$d'i=\text{floor}(256*di/d\text{max}) \text{ if } di<d\text{max}=255 \text{ if } di=d\text{max}$$

where floor (x) stands for a maximum integer not greater than x and dmax is sqrt(64), the square root of 64. In this case, dmax corresponding to the length of the diagonal of a 64-dimensional super cube each side of which is 1 in length and is the maximum value the distance di can take. d'i thus obtained is an integer in the range of 0 to 255 and hence can be represented by one byte.

By concatenating 64 discretized distances a 64-byte key is produced, which is stored in the field d in FIG. 20. Normal relational databases would allow an index of B-tree to be readily set up on the field d.

Figure 21:
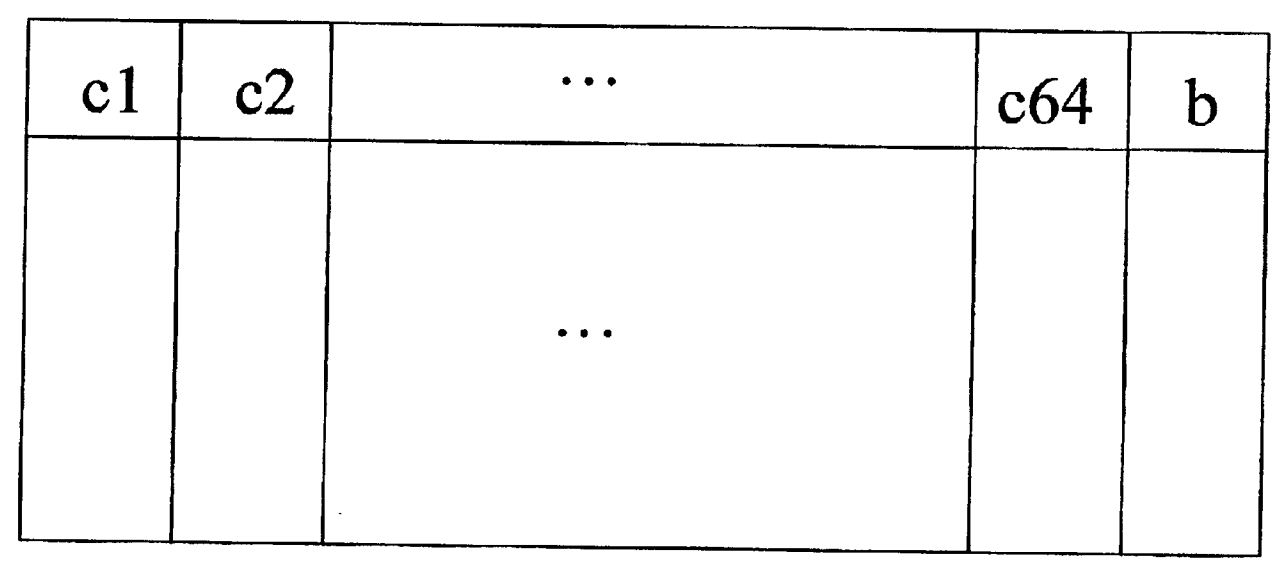

When a bit pattern index is constructed by a relational database, 64 feature parameters and a bit pattern are stored in the form of such a table as shown in FIG. 21. In this case, the field b corresponds to the bit pattern index. The reference point is taken in the same way as with the discrete concatenated distance index. The discretized distance d'i is calculated as follows:

$$d'i=\text{floor}(8*di/d\text{max}) \text{ if } di<d\text{max}=7 \text{ if } di=d\text{max}$$

Next, the d'i-th bit in one byte is set to produce a bit pattern for each distance. The resulting 64 bit patterns are concatenated to produce a 64-byte bit pattern. The bit patterns thus produced for individual object points are stored in the field b.

In determining the d-distance neighborhood in similarity retrieval, a bit pattern for a given sphere is produced and then corresponding bits in that pattern and the bit pattern for each object point stored in the field b are ANDed. If all the bytes of logical products contain a numeral value other than 0, then the feature parameters in the fields c1, c2, . . . , c64 are taken out and the distance between the object point and the specified point is calculated. If the distance is less than d, then the record is extracted as an element of the d-distance neighborhood.

With this method, ANDing of corresponding bits in the bit pattern for each object pattern and the bit pattern for the sphere requires data input/output operations between the main storage and the secondary storage. One way to avoid this is to, when the number of object points is small, expand the bit patterns for all the object points as an array on the main storage and make access to the feature patterns in the secondary storage unit using pointers in the array. This approach requires no data input/output operation for filtering; data input/output operations are performed only when a decision is made as to whether the distance is less than d.

With the storage method shown in FIG. 20, the feature parameters and the discretized distances are stored in relation. The relation is normally stored on pages linked in list form. In addition to this, an index having a B-tree structure is setup on the field storing the discretized distances. In contrast, with the aforementioned method to append the feature parameters to the index, the feature parameters will also be stored in that B-tree.

The retrieval system of FIG. 2 is implemented by an information processing unit (computer) as shown in FIG. 22. The information processing unit of FIG. 22 includes a CPU (central processing unit) 171, a memory 172, an input device 173, an output device 174, an external storage unit 175, a medium driver 176, and a network adapter 177, which are interconnected by a bus 178.

The memory 172 includes a ROM (read only memory), a RAM (random access memory), etc. and stores processing programs and data. The CPU 171 carries out the programs through the use of the memory 172 to perform necessary processing. The multidimensional space management section 111 and the database system 112 in FIG. 1 are implemented by the programs stored in the memory.

The input device 173 is a keyboard, pointing device, touch panel, or the like and is used by a user to enter commands and information. Input information includes specified points, the distance, d, in d-distance neighborhood, the number, k, of elements in k-order neighborhood, and so on. The output device 174 is a display, printer, loudspeaker, or the like and used to output inquiries and the results of retrieval to the user.

The external storage device 175 is a magnetic disk device, optical disk device, optomagnetic disk device, or tape device. The information processing unit loads the programs and data stored in the external storage unit 175 into the memory 172 when necessary for subsequent use. The external storage unit is also used as the secondary storage unit 113 in FIG. 1.

The medium driver 176 drives a portable recording medium 179 to access its recorded contents. As the portable recording medium use may be made of a memory card, flexible disk, CD-ROM (compact disk read only memory), optical disk, optomagnetic disk, or any other computer-readable recording medium. The user is allowed to store the programs and data on the portable recording medium and load them into the memory 172 when necessary.

The network adapter 177 is attached to a communications network, such as a LAN (local area network) or the Internet, and provides data conversion involved in communications. The information processing unit receives the programs and data from another unit via the network adapter 177 and loads them into the memory 172 when necessary.

Figure 23:
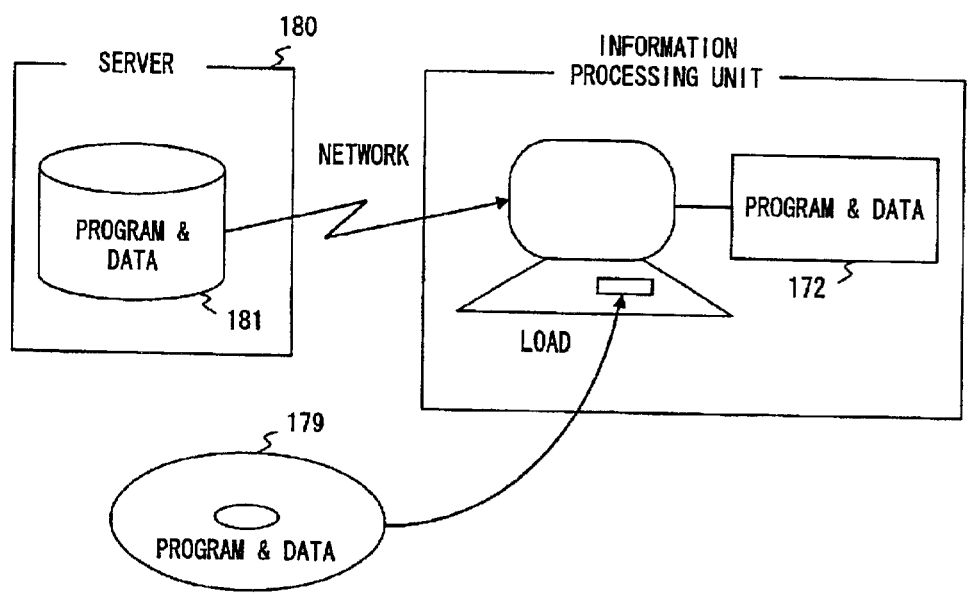
FIG. 23 shows a recording medium.

FIG. 23 shows a computer-readable recording medium which can feed programs and data into the information processing unit of FIG. 22. The programs and data retained on the portable recording medium 179 or in a database 181 of a server 180 are loaded into the memory 172. At this point, the server 180 produces carrier signals to carry the programs and data and sends them to the information processing unit over a transmission medium on the network. The CPU 171 then carries out the programs using the data to implement necessary processing.

According to the embodiment described above, the following advantages can be expected:
• System Simplicity
From a User's Viewpoint A function that common databases have, a B-tree, can be used. Therefore, when a commercial database already used by a user has no multidimensional index, an index for a multidimensional space can be built on the database with relative ease.

From a Database System Developer' Viewpoint

Since a function that common databases have, a B-tree, can be used, the inventive techniques can be incorporated into a database to construct a retrieval system of the invention with ease. Also, the development cost and the maintenance cost can be reduced. In contrast, the addition of a new access method, such as an R-tree, is expected to make the system considerably complex in view of influence on optimization.
• Space Efficiency When object points are allowed to be small in number, there is the possibility that the B-tree index requires less disk space than an R-tree which is a typical multidimensional index. This tendency becomes more pronounced as the dimensions become higher.
• High-speed Performance Since the space efficiency is good as described above, there is the possibility that the number of input/output operations is smaller than with a multidimensional index such as a R-tree, depending on the distribution of object points in a multidimensional space. In addition, the B-tree itself is originally a high-speed access method. It is possible that the overall performance is also more excellent than with a multidimensional index, such as an R-tree, depending on the distribution of object points.

The performance of the inventive processing is subject to the process of determining a set of candidate points. The closer the set of candidate points approaches to the distance neighborhood, the higher the performance becomes and vice versa. An improvement is made by taking two or more reference points; however, too many reference points may degrade the performance.

The processing performance depends also on the distribution of object points. The advantageous distributions to the invention include:

(1) A distribution such that object points are distributed uniformly with respect to the reference point distance.

(2) A distribution such that similar object points are collected locally (as opposed to the spatially uniform distribution); i.e., a spatially biased distribution. The spatially uniform distribution reduces the effectiveness of the reference points; however, with the biased distribution, the possibility of making the reference points effective increases.

Adaptability to High Dimensions
• The inventive processing requires no much overhead even if the number of dimensions is increased. For example, as the number of dimensions increases, the reference points may increase in number, which requires only the amount of disk space and computation to be increased. In this sense, the adaptability to high dimensions is expected to be high.

According to the present invention, in similarity retrieval for determining a set of points close to a specified point in a multidimensional space of feature parameters, an index can be constructed relatively easily, allowing efficient retrieval processing to be implemented.

What is claimed is:

1. An information retrieval device which retrieves from among information items each having a plurality of feature parameters an information item having a feature parameter similar to a specified feature parameter, comprising:

a storage device storing an index which includes a plurality of concatenated keys and pointer information and retains a dictionary type order of the concatenated keys, each concatenated key being produced by discretizing a distance from each of a plurality of reference points to an object point representing information to be retrieved in a multidimensional space consisting of a plurality of dimensions corresponding to the plurality of feature parameters and by concatenating resulting discrete distances, the pointer information allowing access to information corresponding to the object point;

a retrieval device determining a set of object points within a predetermined distance from a point specified in the multidimensional space and acquiring information corresponding to the object points in the set through the use of the index; and an output device outputting the acquired information.

2. The retrieval device according to claim 1, wherein each discrete distance for at least part of a plurality of object points in the multidimensional space is produced by projecting an object point onto a projection reference line to obtain an object projected point and by discretizing a distance from a projection reference point on the projection reference line to the object projected point.

3. The retrieval device according to claim 1, wherein the discrete distances are produced with a distance more than two times a threshold radius of similarity in the multidimensional space as a unit of discretization.

4. The retrieval device according to claim 1, wherein, when the multidimensional space is represented by a super cube, vertexes of the super cube are used as the reference points.

5. The retrieval device according to claim 1, wherein points on an extension of a straight line in the multidimensional space are used as the reference points.

6. The retrieval device according to claim 1, wherein, when the set of object points are included in a plurality of bands of discrete distances from a certain reference point, the retrieval device performs retrieval for each of the bands.

7. The retrieval device according to claim 6, wherein, when a range of retrieval has been narrowed down, the retrieval device switches retrieval from retrieval for each of the bands to sequential retrieval.

8. The retrieval device according to claim 1, wherein, if, in determining a predetermined number of object points in the order in which the object points are close to the specified point, the number of the object points contained in the set of object points within the predetermined distance is not less than the predetermined number, the retrieval device determines the predetermined number of object points from the set, and otherwise the retrieval device repeats a process of determining the set of object points within the predetermined distance while sequentially increasing the predetermined distance.

9. The retrieval device according to claim 1, wherein the index contains feature parameters of the information corresponding to the object points in addition to the concatenated keys and the pointer information.

10. An information retrieval device which retrieves from among information items each having a plurality of feature parameters an information item having a feature parameter similar to a specified feature parameter, comprising:

a storage device storing a plurality of concatenated bit patterns and information to be retrieved corresponding to a plurality of object points in a multidimensional space consisting of a plurality of dimensions corresponding to the plurality of feature parameters, each concatenated bit pattern being produced by discretizing a distance from each of a plurality of reference points to each object point representing the information to be retrieved and by concatenating a plurality of bit patterns representing resulting discrete distances; and a retrieval device determining a set of object points within a predetermined distance from a point specified in the multidimensional space and acquiring information corresponding to the object points in the set through the use of the concatenated bit patterns; and an output device outputting the acquired information.

11. The retrieval device according to claim 10, wherein the retrieval device narrows down candidates of object points by producing a logical product of a concatenated bit pattern for each object point and a bit pattern for a region within a predetermined distance from the specified point.

12. A computer-readable recording medium in which is stored a program for a computer to retrieve from among information items each having a plurality of feature parameters an information item having a feature parameter similar to a specified feature parameter, the program causing the computer to perform:

determining a set of object points within a predetermined distance from a point specified in a multidimensional space consisting of a plurality of dimensions corresponding to the plurality of feature parameters through the use of an index which includes a plurality of concatenated keys and pointer information and retains a dictionary type order of the concatenated keys, each concatenated key being produced by discretizing a distance from each of a plurality of reference points to an object point representing information to be retrieved and by concatenating resulting discrete distances, the pointer information allowing access to information corresponding to the object point;

acquiring information corresponding to the object points in the set through the use of the index; and outputting the acquired information.

13. A computer-readable recording medium in which is stored a program for a computer to retrieve from among information items each having a plurality of feature parameters an information item having a feature parameter similar to a specified feature parameter, the program causing the computer to perform:

determining a set of object points within a predetermined distance from a point specified in a multidimensional space consisting of a plurality of dimensions corresponding to the plurality of feature parameters through the use of a plurality of concatenated bit patterns, each concatenated bit pattern being produced by discretizing a distance from each of a plurality of reference points to each object point representing the information to be retrieved and by concatenating a plurality of bit patterns representing resulting discrete distances;

acquiring information corresponding to the object points in the set through the use of the concatenated bit patterns; and outputting the acquired information.

14. A propagation signal for propagating a program to a computer which retrieves from among information items each having a plurality of feature parameters an information item having a feature parameter similar to a specified feature parameter, the program causing the computer to perform:

determining a set of object points within a predetermined distance from a point specified in a multidimensional space consisting of a plurality of dimensions corresponding to the plurality of feature parameters through the use of an index which includes a plurality of concatenated keys and pointer information and retains a dictionary type order of the concatenated keys, each concatenated key being produced by discretizing a distance from each of a plurality of reference points to an object point representing information to be retrieved and by concatenating resulting discrete distances, the pointer information allowing access to information corresponding to the object point;

acquiring information corresponding to the object points in the set through the use of the index; and outputting the acquired information.

15. A propagation signal for propagating a program to a computer which retrieves from among information items each having a plurality of feature parameters an information item having a feature parameter similar to a specified feature parameter, the program causing the computer to perform:

determining a set of object points within a predetermined distance from a point specified in a multidimensional space consisting of a plurality of dimensions corresponding to the plurality of feature parameters through the use of a plurality of concatenated bit patterns, each concatenated bit pattern being produced by discretizing a distance from each of a plurality of reference points to each object point representing the information to be retrieved and by concatenating a plurality of bit patterns representing resulting discrete distances;

acquiring information corresponding to the object points in the set through the use of the concatenated bit patterns; and outputting the acquired information.

16. A computer-readable recording medium stored with data which, when referred to by a computer, allows the computer to retrieve from among information items each having a plurality of feature parameters an information item having a feature parameter similar to a specified feature parameter, wherein the data has an index structure including a plurality of concatenated keys and pointer information, each concatenated key being produced by discretizing a distance from each of a plurality of reference points to an object point representing information to be retrieved in a multidimensional space consisting of a plurality of dimensions corresponding to the plurality of feature parameters and by concatenating resulting discrete distances, the pointer information allowing access to information corresponding to the object point, the index structure being configured to retain a dictionary type order of the concatenated keys and to allow the computer to determine a set of object points within a predetermined distance from a point specified in the multidimensional space through the use of the concatenated keys and acquire information corresponding to the object points in the set through the use of the pointer information.

17. A computer-readable recording medium stored with data which, when referred to by a computer, allows the computer to retrieve from among information items each having a plurality of feature parameters an information item having a feature parameter similar to a specified feature parameter, wherein the data has an index structure including a plurality of concatenated bit patterns and information to be retrieved corresponding to a plurality of object points in a multidimensional space consisting of a plurality of dimensions corresponding to the plurality of feature parameters, each concatenated bit pattern being produced by discretizing a distance from each of a plurality of reference points to each object point representing the information to be retrieved and by concatenating a plurality of bit patterns representing resulting discrete distances, the index structure being configured to allow the computer to determine a set of object points within a predetermined distance from a point specified in the multidimensional space and acquire information corresponding to the object points in the set through the use of the concatenated bit patterns.

18. A method of retrieving from among information items each having a plurality of feature parameters an information item having a feature parameter similar to a specified feature parameter, comprising:

discretizing a distance from each of a plurality of reference points to an object point representing information to be retrieved in a multidimensional space consisting of a plurality of dimensions corresponding to the plurality of feature parameters;

concatenating resulting discrete distances to produce a concatenated key;

entering an index including a plurality of concatenated keys and pointer information to make access to information corresponding to the object point and retaining a dictionary type order of the concatenated keys into a computer system;

determining a set of object points within a predetermined distance from a point specified in the multidimensional space through the use of the index; and acquiring information corresponding to the object points in the set through the use of the index.

19. A method of retrieving from among information items each having a plurality of feature parameters an information item having a feature parameter similar to a specified feature parameter, comprising:

discretizing a distances from each of a plurality of reference points to an object point representing information to be retrieved in a multidimensional space consisting of a plurality of dimensions corresponding to the plurality of feature parameters;

concatenating a plurality of bit patterns representing resulting discrete distances to produce a concatenated bit pattern;

entering a plurality of concatenated bit patterns into a computer system;

determining a set of object points within a predetermined distance from a point specified in the multidimensional space through the use of the concatenated bit patterns; and acquiring information corresponding to the object points in the set through the use of the concatenated bit patterns.

20. An information retrieval device which retrieves from among information items each having a plurality of feature parameters an information item having a feature parameter similar to a specified feature parameter, comprising:

storage means for storing an index which includes a plurality of concatenated keys and pointer information and retains a dictionary type order of the concatenated keys, each concatenated key being produced by discretizing a distance from each of a plurality of reference points to an object point representing information to be retrieved in a multidimensional space consisting of a plurality of dimensions corresponding to the plurality of feature parameters and by concatenating resulting discrete distances, the pointer information allowing access to information corresponding to the object point;

retrieval means for determining a set of object points within a predetermined distance from a point specified in the multidimensional space and acquiring information corresponding to the object points in the set through the use of the index; and output means for outputting the acquired information.

21. An information retrieval device which retrieves from among information items each having a plurality of feature parameters an information item having a feature parameter similar to a specified feature parameter, comprising:

storage means for storing a plurality of concatenated bit patterns and information to be retrieved corresponding to a plurality of object points in a multidimensional space consisting of a plurality of dimensions corresponding to the plurality of feature parameters, each concatenated bit pattern being produced by discretizing a distance from each of a plurality of reference points to each object point representing the information to be retrieved and by concatenating a plurality of bit patterns representing resulting discrete distances; and retrieval means for determining a set of object points within a predetermined distance from a point specified in the multidimensional space and acquiring information corresponding to the object points in the set through the use of the concatenated bit patterns; and output means for outputting the acquired information.

* * * * *